(12) United States Patent
Maeda et al.

(10) Patent No.: US 7,441,401 B2
(45) Date of Patent: Oct. 28, 2008

(54) CONTROL APPARATUS FOR INTERNAL COMBUSTION ENGINE

(75) Inventors: Osamu Maeda, Tokyo (JP); Keiichi Enoki, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 97 days.

(21) Appl. No.: 11/491,941

(22) Filed: Jul. 25, 2006

(65) Prior Publication Data

US 2007/0163237 A1 Jul. 19, 2007

(30) Foreign Application Priority Data

Jan. 13, 2006 (JP) .............................. 2006-006096

(51) Int. Cl.
*F01N 3/00* (2006.01)
(52) U.S. Cl. .............................. 60/284; 60/274; 60/285; 60/286; 123/1 A; 123/418
(58) Field of Classification Search .................. 60/274, 60/276, 284, 285, 286; 123/1 A, 418
See application file for complete search history.

(56) References Cited

U.S. PATENT DOCUMENTS

| | | | | |
|---|---|---|---|---|
| 5,711,272 | A | * | 1/1998 | Maegawa et al. ...... 123/406.53 |
| 6,041,591 | A | * | 3/2000 | Kaneko et al. ................ 60/274 |
| 6,505,594 | B1 | * | 1/2003 | Katayama et al. ...... 123/179.18 |
| 6,751,948 | B2 | * | 6/2004 | Takemura et al. ............. 60/284 |
| 7,185,487 | B2 | * | 3/2007 | Lewis et al. .................... 60/289 |
| 7,194,999 | B2 | * | 3/2007 | Kono et al. ............ 123/406.47 |

FOREIGN PATENT DOCUMENTS

| | | |
|---|---|---|
| JP | 4-058051 A | 2/1992 |
| JP | 4-259639 A | 9/1992 |
| JP | 2001-107796 A | 4/2001 |
| JP | 2001-182591 A | 7/2001 |
| JP | 2002-309995 A | 10/2002 |

* cited by examiner

*Primary Examiner*—Binh Q Tran
(74) *Attorney, Agent, or Firm*—Sughrue Mion, PLLC

(57) ABSTRACT

The present invention provides a control apparatus for an internal combustion engine which can make a determination on fuel property with high accuracy without causing a cost increase. The control apparatus for the internal combustion engine includes: an intake air amount control unit for controlling an intake air amount of the engine;
an ignition timing control unit for controlling an ignition timing of the engine; a catalyst heat-up control unit for increasing the intake air amount after cold start of the engine and performing control for retarding the ignition timing; an air-fuel ratio detecting unit for detecting an air-fuel ratio of exhaust gas in the engine; and a fuel property determining unit for making a determination on fuel property through a comparison between a parameter value calculated from the air-fuel ratio and a preset reference value when the catalyst heat-up control unit performs the control for retarding the ignition timing.

7 Claims, 18 Drawing Sheets

CONTROL APPARATUS FOR INTERNAL COMBUSTION ENGINE

BACKGROUND OF THE INVENTION

1. Field of the Invention

The present invention relates to a control apparatus for an internal combustion engine which has a function of making a determination on a property of a fuel supplied thereto.

2. Description of the Related Art

In many cases, a generally employed gasoline engine has fuel injection valves provided in intake pipes respectively, and the fuel injection valves inject a fuel toward intake ports respectively.

Although much of the injected fuel is directly sucked into cylinders during a suction stroke, the rest of the fuel adheres to inner wall surfaces of the intake ports or surfaces of intake valves and then gradually evaporates to be sucked into the cylinders. The fuel that has not evaporated is gradually sucked into the cylinders during or after a subsequent suction stroke.

As described above, the injected fuel is not entirely sucked into the cylinders during a single suction stroke. In other words, part of the fuel is sucked into the cylinders with a delay.

The adhesion of the fuel to the intake ports and the like causes fluctuations in air-fuel ratio when the engine enters a transient operational state. Especially when the engine is in a cold state, the fuel is unlikely to evaporate due to a low temperature in the vicinity of the intake ports, so the fluctuations in air-fuel ratio tend to become greater.

For instance, during cold start of the engine or during acceleration in a cold state, the fuel injection valves inject a large amount of the fuel, but the air-fuel ratio becomes lean owing to a temporary shortage of the fuel in the cylinders resulting from the fuel adherent to the intake ports and the like. This raises a problem in that unstable start-up of the engine leads to a deterioration in driveability and the contamination of exhaust gas.

With a view to solving this problem, in general, fuel injection control is performed in consideration of a fuel response delay ascribable to the fuel adherent to the intake ports and the like to suppress a deterioration in driveability and the contamination of exhaust gas.

However, the evaporation amount of the fuel changes depending on the property thereof, which is set differently according to a manufacturer, a season, or a sales territory.

For example, as a rule, a fuel referred to as summer gasoline is set lower in volatility than a fuel referred to as winter gasoline to prevent excessive volatilization from occurring due to high air temperatures in summer. For this reason, summer gasoline is referred to as low volatile fuel, whereas winter gasoline is referred to as high volatile fuel.

When a driver adds low volatile fuel to his vehicle in a case where fuel injection controls are calibrated for standard fuel (for example fuel for emission regulations), a lean air-fuel ratio is generated due to the fact that low volatile fuel has lower volatility than standard fuel. Therefore, problems such as a deterioration in driveability and the contamination of exhaust gas are caused. Such problems arise when the engine enters a transient operational state as a result of, for example, start-up or acceleration/deceleration so that a great change is caused in fuel injection amount.

Thus, in order to solve the above-mentioned problems, a conventional control apparatus for an internal combustion engine is equipped with intake air amount control means, ignition timing control means, catalyst heat-up promoting means, and lean control means.

The intake air amount control means controls an intake air amount of the internal combustion engine. The ignition timing control means controls an ignition timing of the internal combustion engine. The catalyst heat-up promoting means increases the intake air amount immediately after the start of the internal combustion engine, and performs control for retarding the ignition timing such that the rotational speed of the internal combustion engine coincides with a target rotational speed. The lean control means performs control such that the air-fuel ratio of a mixture supplied to the internal combustion engine immediately after the start thereof becomes lean with respect to a stoichiometric air-fuel ratio, and suppresses a degree of leanness of the air-fuel ratio when the retardation amount of the ignition timing during operation of the catalyst heat-up promoting means does not reach a predetermined retardation amount (e.g., see JP 2001-182591 A).

A conventional fuel property determining apparatus for an internal combustion engine is equipped with a fuel injection valve, an air-fuel ratio sensor, wet amount control means, and fuel property determining means.

The fuel injection valve injects fuel. The air-fuel ratio sensor detects an air-fuel ratio of exhaust gas or whether the air-fuel ratio is rich or lean. The wet amount control means performs control for reducing a wet amount, namely, an amount of fuel adherent to an intake system, which has been injected from the fuel injection valve prior to the activation of the air-fuel ratio sensor, and ends this control to increase the wet amount after the activation of the air-fuel ratio sensor. The fuel property determining means makes a determination on fuel property based on an output of the air-fuel ratio sensor or a control parameter that changes in accordance therewith, after the activation of the air-fuel ratio sensor (e.g., see JP 2002-309995 A).

In the conventional control apparatus for the internal combustion engine disclosed in JP 2001-182591 A, the influence of a fuel response delay emerges only when the engine enters a transient operational state. Therefore, no change is caused in fuel injection amount when the rotational speed of the engine is held constant.

Thus, there is caused a problem in that the accuracy in making a determination on fuel property decreases to the extent of bringing about an erroneous determination.

In the fuel property determining apparatus for the internal combustion engine disclosed in JP 2002-309995 A, the timing for opening an intake valve needs to be set at or past a top dead center so as to perform the control for reducing the wet amount.

Thus, it becomes necessary to set special variable timings for opening/closing the intake valve. As a result, there is also caused a problem of a cost increase.

SUMMARY OF THE INVENTION

The present invention has been made to solve the problems as mentioned above, and it is therefore an object of the present invention to provide a control apparatus for an internal combustion engine which can make a determination on fuel property with high accuracy without causing a cost increase.

According to an aspect of the present invention, there is provided a control apparatus for an internal combustion engine, including: intake air amount control means for controlling an intake air amount of the internal combustion engine; ignition timing control means for controlling an ignition timing of the internal combustion engine; catalyst heat-up control means for increasing the intake air amount after cold start of the internal combustion engine and performing control for retarding the ignition timing; air-fuel ratio detecting means for detecting an air-fuel ratio of exhaust gas in the internal combustion engine; and fuel property determining means for making a determination on fuel property through a comparison between a parameter value calculated from the air-fuel ratio and a preset reference value when the catalyst heat-up control means performs the control for retarding the ignition timing.

In the control apparatus for the internal combustion engine according to the present invention, the catalyst heat-up control means performs the control for retarding the timing for igniting fuel after cold start of the internal combustion engine, so the same transient operational state is created every time the internal combustion engine is started. The parameter value calculated from the air-fuel ratio of the exhaust gas generated at this moment is then compared with the reference value. Consequently, the determination on fuel property can be made with high accuracy without entailing a cost increase.

DETAILED DESCRIPTION OF THE PREFERRED EMBODIMENTS

Respective embodiments of the present invention will be described hereinafter with reference to the drawings, in which like or corresponding members and portions are denoted by like reference symbols.

First Embodiment

Figure 1:
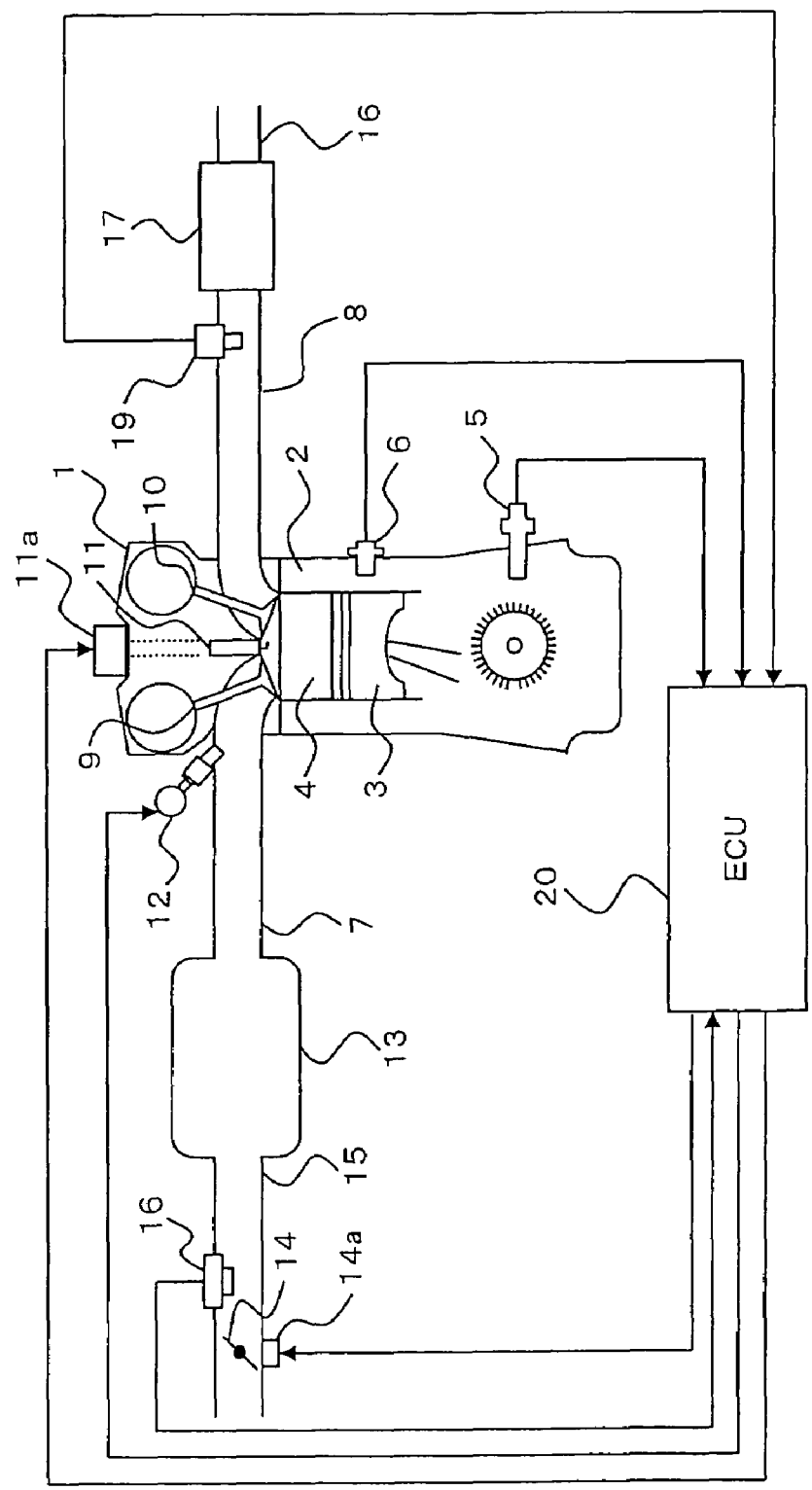
FIG. 1 is a block diagram showing an entire system including a control apparatus for an internal combustion engine according to a first embodiment of the present invention.

FIG. 1 is a block diagram showing an entire system including a control apparatus for an internal combustion engine according to a first embodiment of the present invention. Although the internal combustion engine is generally provided with a plurality of cylinders 2, only one of them will be described in the following embodiments.

Referring to FIG. 1, an engine 1 has a combustion chamber 4 into which a mixture composed of a fuel and air is sucked by the cylinder 2 and a piston 3 to be burned. The cylinder 2 assumes a tubular shape. The piston 3 is connected to a crankshaft (not shown).

The piston 3 is reciprocably provided in an axial direction of the cylinder 2. The crankshaft is provided with a crank angle sensor 5 for generating a signal in synchronization with rotation of the engine 1. The cylinder 2 is provided with a coolant temperature sensor 6 for outputting a voltage corresponding to a temperature of a coolant (not shown) for cooling the engine 1.

An intake port 7 for sucking air into the cylinder 2 and an exhaust manifold 8 for discharging exhaust gas generated through combustion of the mixture in the combustion chamber 4 are connected to the cylinder 2. The cylinder 2 is also mounted with an intake valve 9 for opening/closing a boundary between the combustion chamber 4 and the intake port 7, and an exhaust valve 10 for opening/closing a boundary between the combustion chamber 4 and the exhaust manifold 8.

The cylinder 2 is also mounted, on a top portion thereof, with an ignition plug 11 for igniting the mixture supplied into the combustion chamber 4.

A fuel injection valve 12 for injecting fuel is mounted in the vicinity of the intake valve 9 and on the downstream side of the intake port 7. The fuel can thereby be supplied into the cylinder 2 at an optimum timing.

A surge tank 13 for temporarily storing the air to be sucked into the combustion chamber 4 is connected on the upstream side of the intake port 7. An intake manifold 15 for distributing to each cylinder 2 the air sucked from the outside via a throttle valve 14 is connected on the upstream side of the surge tank 13.

A boost pressure sensor 16 for outputting a voltage corresponding to a boost pressure is provided on the downstream side of the throttle valve 14.

A catalytic unit 17 for removing harmful substances from exhaust gas is connected on the downstream side of the exhaust manifold 8. A tail pipe 18 for discharging exhaust gas to the outside is connected on the downstream side of the catalytic unit 17.

The exhaust manifold 8 is provided with a linear air-fuel ratio sensor 19 (hereinafter abbreviated as "the LAFS 19") for linearly outputting a voltage corresponding to an air-fuel ratio of exhaust gas.

An operation of opening/closing the throttle valve 14, an ignition timing of the ignition plug 11, and an operation of injecting fuel through the fuel injection valve 12 are controlled by an electronic control unit 20 for engine control (hereinafter abbreviated as "the ECU 20"), which constitutes an essential part of the control apparatus for the internal combustion engine.

The ECU 20 is composed of a microcomputer (not shown), a drive circuit (not shown) for driving actuators, and an I/O interface (not shown) for inputting/outputting various signals therethrough. The microcomputer has a CPU for performing calculation processings, a ROM for storing data on programs and fixed values, and a RAM for updating the stored data to rewrite them sequentially.

Throttle valve control means, ignition timing control means, fuel injection control means, air-fuel ratio feedback correction means, catalyst heat-up control means, air-fuel ratio detecting means, fuel property determining means, a first air-fuel ratio difference integrating means, and fuel injection amount changeover means are stored in a memory of the ECU 20 as pieces of software. A certain region of the memory is used as fuel property storing means.

Voltages as output values from the coolant temperature sensor 6, the boost pressure sensor 16, and the LAFS 19 are subjected to A/D conversion and then input to the ECU 20. The output values subjected to A/D conversion are used for calculations made in the aforementioned respective means as a coolant temperature Tw, a boost pressure Pb, and an air-fuel ratio AF. Furthermore, a signal from the crank angle sensor 5 is input to the ECU 20 in an interruptive manner, and an engine speed Ne is calculated from a count value of a timer incorporated in the ECU 20 and the signal from the crank angle sensor 5 to be used for the calculations made in the aforementioned respective means.

The throttle valve control means calculates an opening degree TH of the throttle valve 14 in accordance with an accelerator opening degree at the time when a driver depresses an accelerator pedal (not shown), and outputs a voltage corresponding to the opening degree TH to a throttle actuator 14a to operate the throttle valve 14, thereby adjusting the amount of the air to be sucked into the cylinder 2.

The air sucked from the outside in accordance with the above-mentioned opening degree TH is sucked into the combustion chamber 4 via the intake manifold 15, the surge tank 13, and the intake port 7.

The throttle valve control means performs feedback (hereinafter abbreviated as "F/B") control of the opening degree TH of the throttle valve 14 such that the engine speed Ne coincides with a target engine speed set based on the coolant temperature Tw, during idling.

The ignition timing control means calculates a base ignition timing SAb for igniting the mixture supplied into the combustion chamber 4, based on the boost pressure Pb and the engine speed Ne. The ignition timing control means also subjects the base ignition timing SAb to a correction corresponding to catalyst heat-up control to calculate a final ignition timing SA. An ignition signal is output to an ignition coil 11a having a built-in power transistor at a timing corresponding to the ignition timing SA, so the mixture is ignited by the ignition plug 11.

The fuel injection control means calculates a base fuel injection time Tb based on the boost pressure Pb and the engine speed Ne. The air-fuel ratio F/B correction means performs a proportional integral differential (PID) calculation using the air-fuel ratio AF and a target air-fuel ratio set to, for example, a stoichiometric air-fuel ratio, thereby calculating an air-fuel ratio F/B correction amount AFFB.

The fuel injection control means also subjects the base fuel injection time Tb to a correction corresponding to the air-fuel ratio F/B correction amount AFFB, a correction corresponding to the coolant temperature Tw, and a correction corresponding to an adhesive fuel amount Twet which represents an amount of fuel adherent to the intake port 7 and the like, and adds to the corrected base fuel injection time Tb a dead time Td from a time point when the fuel injection valve 12 is energized to a time point when the fuel injection valve 12 is actually opened, thereby calculating a final fuel injection time Ti. The fuel injection valve 12 is driven in accordance with the fuel injection time Ti.

The catalyst heat-up control means issues to the throttle valve control means a command to increase an opening degree of the throttle valve 14 after cold start of the engine 1, and issues to the ignition timing control means a command to retard an ignition timing.

The air-fuel ratio detecting means subjects a voltage as an output value from the LAFS 19 to A/D conversion and outputs the air-fuel ratio AF.

The first air-fuel ratio difference integrating means integrates a first air-fuel ratio difference dAFf which is a difference between the air-fuel ratio AF detected by the air-fuel ratio detecting means and a preset reference air-fuel ratio, until the lapse of a predetermined time since the start of the aforementioned catalyst heat-up control, and outputs an integrated value ΣdAFf of the first air-fuel ratio difference.

The fuel property determining means compares the integrated value ΣdAFf of the first air-fuel ratio difference output from the first air-fuel ratio difference integrating means with a threshold THLD1 (a reference value) which is set in accordance with the coolant temperature Tw while the aforementioned catalyst heat-up control is performed, to make a determination on fuel property.

The fuel injection amount changeover means issues to the fuel injection control means a command to make a changeover in fuel injection amount, based on a result of the determination made by the fuel property determining means and stored by the fuel property storing means.

Figure 2:
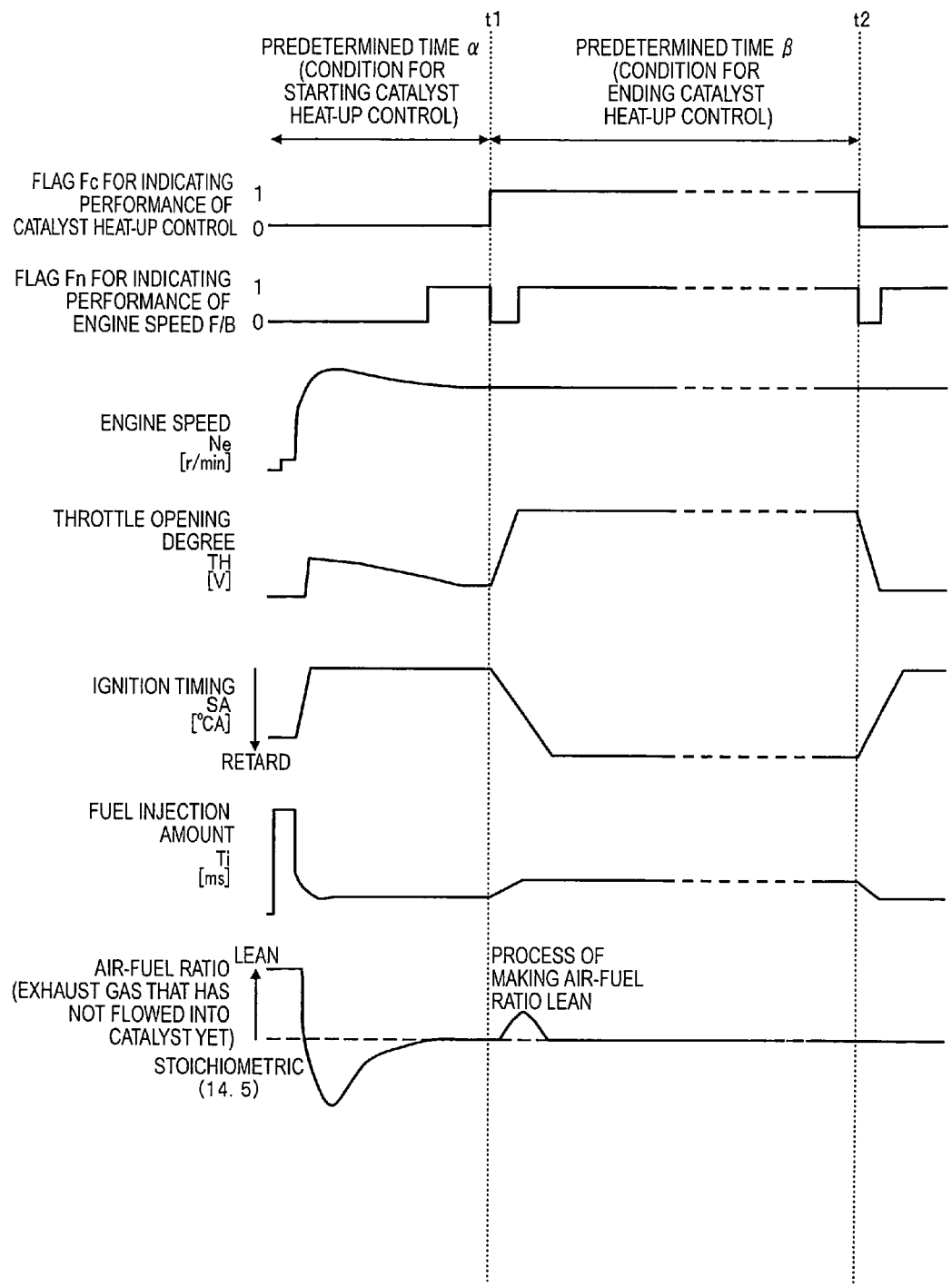
FIG. 2 is a timing chart showing catalyst heat-up control performed by catalyst heat-up control means of an ECU of FIG. 1.

The catalyst heat-up control performed by the catalyst heat-up control means will now be described in detail with reference to a timing chart of FIG. 2. FIG. 2 shows how this catalyst heat-up control is performed after cold start of the engine 1.

First of all, a flag Fc for indicating the performance of catalyst heat-up control, which is provided in a microprocessor, is set to "1" at a time point t1, namely, after the lapse of a predetermined time since cold start of the engine 1, so catalyst heat-up control is started.

When the flag Fc for indicating the performance of catalyst heat-up control is set to "1", engine speed F/B control which has already been started is temporarily stopped, so the throttle valve 14 is opened up to a maximum permissible opening degree in an idling state of the engine 1. Then, when the opening degree TH of the throttle valve 14 reaches the maximum permissible opening degree, the stopped engine speed F/B control is resumed.

As soon as the throttle valve 14 is opened, the base ignition timing SAb is subjected to a correction based on an ignition timing retard amount SAr corresponding to the coolant temperature Tw, so the final ignition timing SA is so controlled as to be retarded gradually.

Since an increase in torque resulting from an increase in the amount of the air sucked into the cylinder 2 is counterbalanced with a decrease in torque resulting from a retardation of the ignition timing, the engine speed Ne is held constant. When catalyst heat-up control is started, the boost pressure Pb increases as the opening degree TH of the throttle valve 14 increases. Therefore, although the engine speed Ne is constant, a transient state arises in the cylinder 2. As a result, the air-fuel ratio temporarily becomes lean.

Then, the flag Fc for indicating the performance of catalyst heat-up control is set to "0" at a time point t2, namely, after the lapse of a predetermined time β from the time point t1, so catalyst heat-up control is ended.

As described above, since the temperature of exhaust gas rises through the retardation of the ignition timing, the time required for activation of the catalyst can be shortened by raising the temperature thereof.

An operation of making a determination on fuel property in the control apparatus for the internal combustion engine constructed as described above will be described hereinafter.

Figure 3:
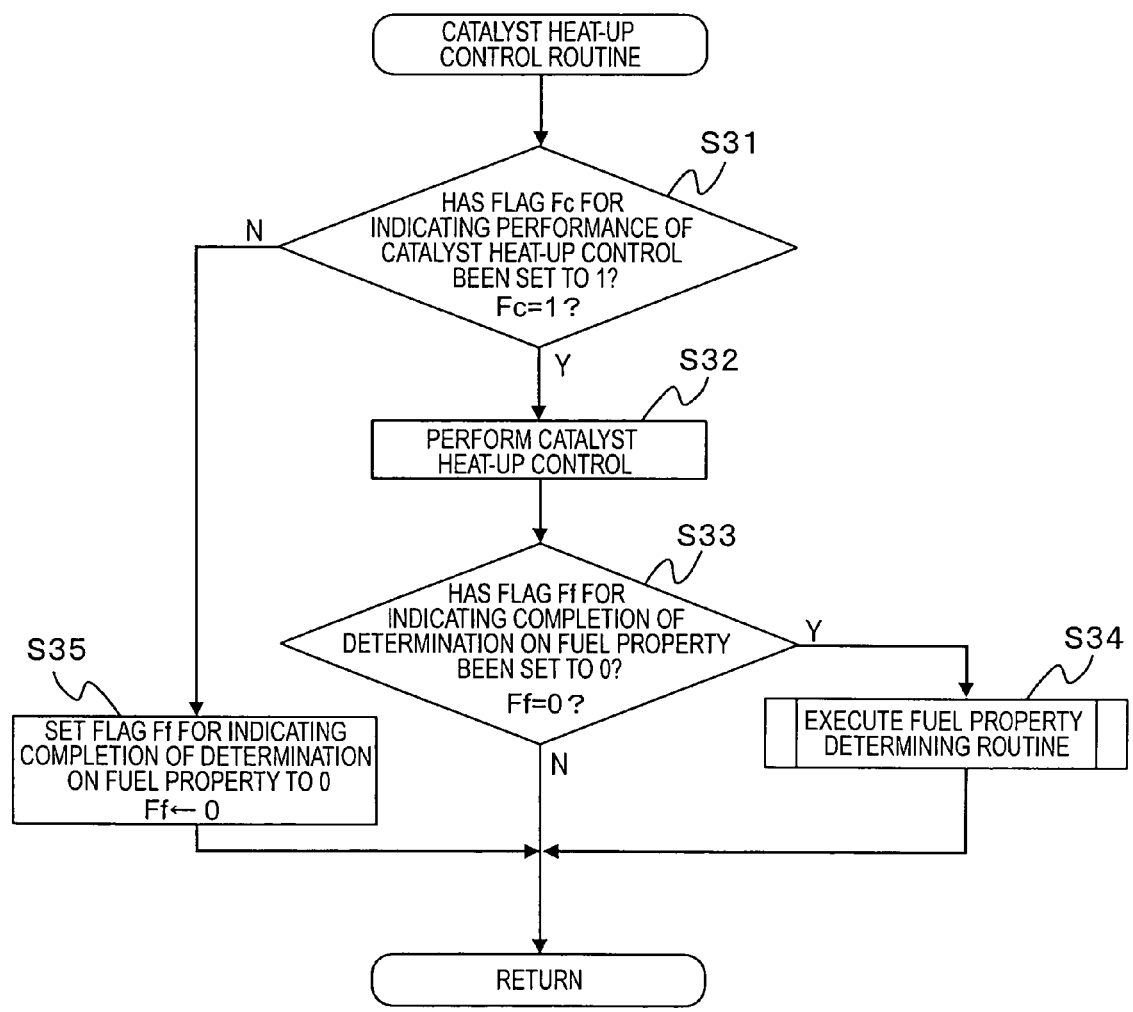
FIG. 3 is a flowchart showing how the catalyst heat-up control means of the ECU according to the first embodiment of the present invention operates to perform catalyst heat-up control.

First of all, an operation of the catalyst heat-up control means in performing catalyst heat-up control will be described in detail with reference to a flowchart of FIG. 3. This operation is performed as a subroutine while a main routine is executed in the ECU 20 at intervals of a predetermined time.

First of all, it is determined whether or not the flag Fc for indicating the performance of catalyst heat-up control has been set to "1" (Step S31).

When it is determined in Step S31 that the flag Fc for indicating the performance of catalyst heat-up control has been set to "1" (i.e., Yes), the aforementioned catalyst heat-up control is performed (Step S32). It is then determined whether or not a flag Ff for indicating the completion of a determination on fuel property has been set to "0" (Step S33).

Figure 4:
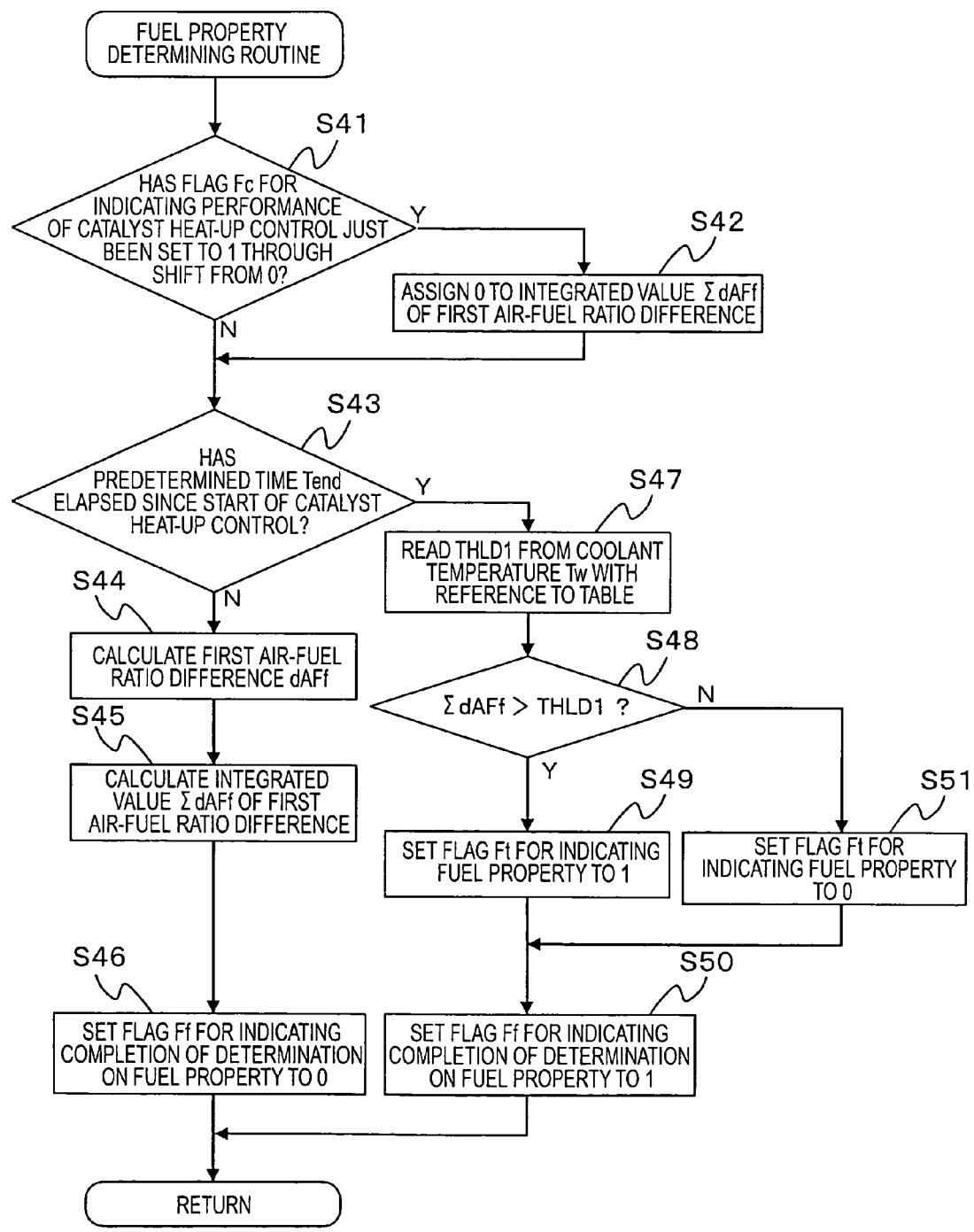
FIG. 4 is a flowchart showing how fuel property determining means of the ECU according to the first embodiment of the present invention operates to make a determination on fuel property.

When it is determined in Step S33 that the flag Ff for indicating the completion of a determination on fuel property has been set to "0" (i.e., Yes), a transition to a fuel property determining routine shown in a flowchart of FIG. 4 is made to make a determination on fuel property (Step S34). After that, a return to a main routine is made.

On the other hand, when it is determined in Step S33 that the flag Ff for indicating the completion of a determination on fuel property has not been set to "0" (i.e., No) because the determination on fuel property has already been completed, a return to the main routine is made immediately.

Meanwhile, when it is determined in Step S31 that the flag Fc for indicating the performance of catalyst heat-up control has not been set to "1" (i.e., No), the flag Ff for indicating the completion of a determination on fuel property is set to "0" (Step S35) to make a return to the main routine.

Next, an operation of the fuel property determining means in making a determination on fuel property will be described in detail with reference to a flowchart of FIG. 4. This operation is performed as a subroutine in Step S34 of the flowchart of FIG. 3.

First of all, it is determined whether or not the flag Fc for indicating the performance of catalyst heat-up control has just been set to "1" through a shift from "0" owing to the start of catalyst heat-up control by the catalyst heat-up control means (Step S41).

When it is determined in Step S41 that the flag Fc for indicating the performance of catalyst heat-up control has just been set to "1" through a shift from "0" (i.e., Yes), "0" is assigned to the integrated value ΣdAFf of the first air-fuel ratio difference as an initial value (Step S42). It is then determined whether or not a predetermined time Tend has elapsed since the start of catalyst heat-up control (Step S43). The predetermined time Tend is set longer than a time required for the completion of a process of making the air-fuel ratio lean through the control for retarding the ignition timing.

On the other hand, when it is determined in Step S41 that the flag Fc for indicating the performance of catalyst heat-up control has not just been set to "1" through a shift from "0" (i.e., No), a transition to Step S43 is made.

When it is determined in Step S43 that the predetermined time Tend has not elapsed (i.e., No), the first air-fuel ratio difference integrating means calculates the first air-fuel ratio difference dAFf (Step S44).

In Step S44, given that a target air-fuel ratio AFr in the air-fuel ratio F/B correction means is set as a reference air-fuel ratio, the first air-fuel ratio difference dAFf is expressed by an equation (1) shown below.

$$dAFf = AF - AFr \tag{1}$$

Then, the first air-fuel ratio difference integrating means calculates an integrated value ΣdAFf of the first air-fuel ratio difference (Step S45).

In Step S45, given that [n], [n−1], and Δt represent a current value, a last value, and a calculation cycle respectively, the integrated value ΣdAFf of the first air-fuel ratio difference is expressed by an equation (2) shown below.

$$\Sigma dAFf[n] = \Sigma dAFf[n-1] + dAFf \times \Delta t \tag{2}$$

Then, since the determination on fuel property has not been completed, the flag Ff for indicating the completion of the determination on fuel property is set to "0" (Step S46), and a return to the subroutine of catalyst heat-up control is made.

Figure 5:
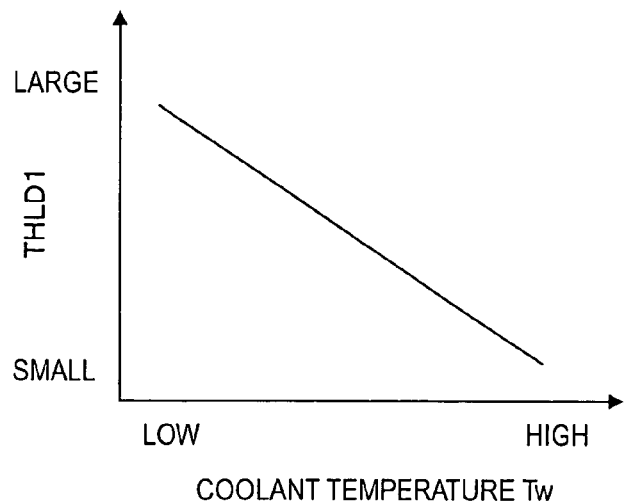
FIG. 5 is an explanatory diagram showing a relationship between a coolant temperature and a threshold in the determination on fuel property shown in FIG. 4.

On the other hand, when it is determined in Step S43 that the predetermined time Tend has elapsed (i.e., Yes), a threshold THLD1 is read from the coolant temperature Tw with reference to, for example, a table shown in FIG. 5 (Step S47).

It is then determined whether or not the integrated value ΣdAFf of the first air-fuel ratio difference is larger than the threshold THLD1 (Step S48).

When it is determined in Step S48 that the integrated value ΣdAFf of the first air-fuel ratio difference is larger than the threshold THLD1 (i.e., Yes), a flag Ft for indicating fuel property is set to "1" (Step S49) on the ground that low volatile fuel is used. The flag Ff for indicating the completion of the determination on fuel property is then set to "1" (Step S50), and a return to the subroutine of catalyst heat-up control is made.

On the other hand, when it is determined in Step S48 that the integrated value ΣdAFf of the first air-fuel ratio difference is equal to or smaller than the threshold THLD1 (i.e., No), the flag Ft for indicating fuel property is set to "0" on the ground that standard fuel is used (Step S51). The flag Ff for indicating the completion of the determination on fuel property is then set to "1" (Step S50), and a return to the subroutine of catalyst heat-up control is made.

A result of the determination made by the fuel property determining means is stored in the fuel property storing means, so a value corresponding to the result is held even after the engine 1 has been turned off. This value becomes effective when the engine 1 is started next time.

Next, an operation of the fuel injection amount changeover means in making a changeover in fuel injection amount based on fuel property will be described in detail with reference to a flowchart of FIG. 6. This operation is performed when the engine 1 is started.

That is, when the driver turns a key with the engine 1 stopped, a starter thereof starts rotating. After that, the fuel injection amount changeover means makes a changeover in fuel injection amount to start the engine 1.

First of all, it is determined whether or not the flag Ft for indicating fuel property, which represents a result of a determination made on fuel property during the last operation of the engine 1, has been set to "1" (Step S61).

When it is determined in Step S61 that the flag Ft for indicating fuel property has not been set to "1" (i.e., No), a standard fuel injection time is set based on the coolant temperature Tw, using a prestored engine-start fuel injection time map for standard fuel. The standard fuel injection time is then output to the fuel injection control means (Step S62), and a return to the main routine is made.

On the other hand, when it is determined in Step S61 that the flag Ft for indicating fuel property has been set to "1" (i.e., Yes), a low volatile fuel injection time is set based on the coolant temperature Tw, using a prestored engine-start fuel injection time map for low volatile fuel. The low volatile fuel injection time is then output to the fuel injection control means (Step S63), and a return to the main routine is made.

The low volatile fuel injection time is set longer than the standard fuel injection time by a time length corresponding to, for example, about 20% thereof.

Figure 6:
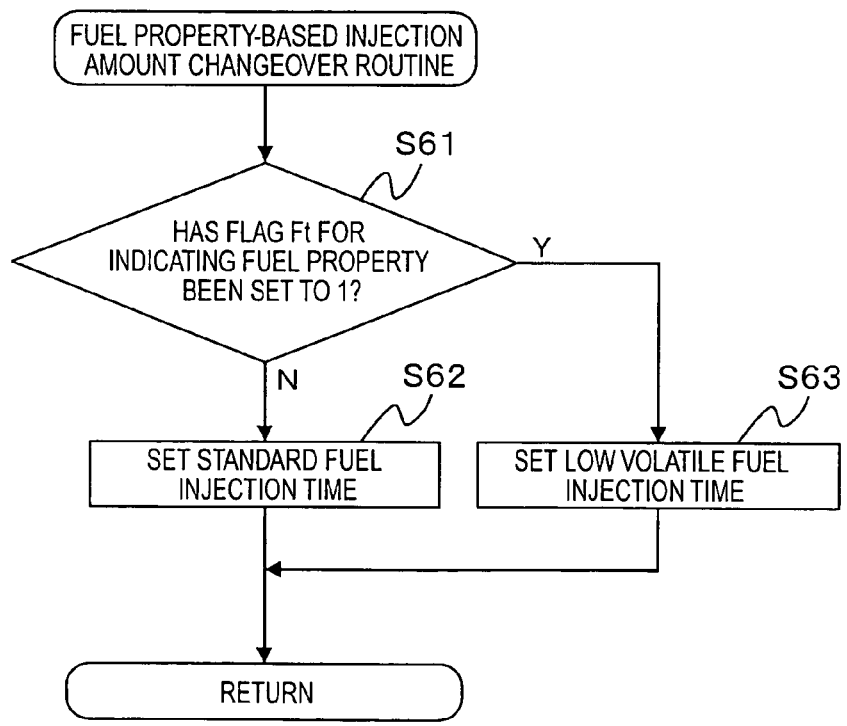
FIG. 6 is a flowchart showing how fuel injection amount changeover means of the ECU according to the first embodiment of the present invention operates to make a changeover in fuel injection amount based on fuel property.

The flowchart of FIG. 6 explains how to make a changeover in fuel injection amount in starting the engine 1. However, a changeover in fuel injection amount can be made in accordance with fuel property during acceleration or deceleration as well by storing acceleration/deceleration fuel injection time maps for standard fuel and low volatile fuel in advance.

Figure 7:
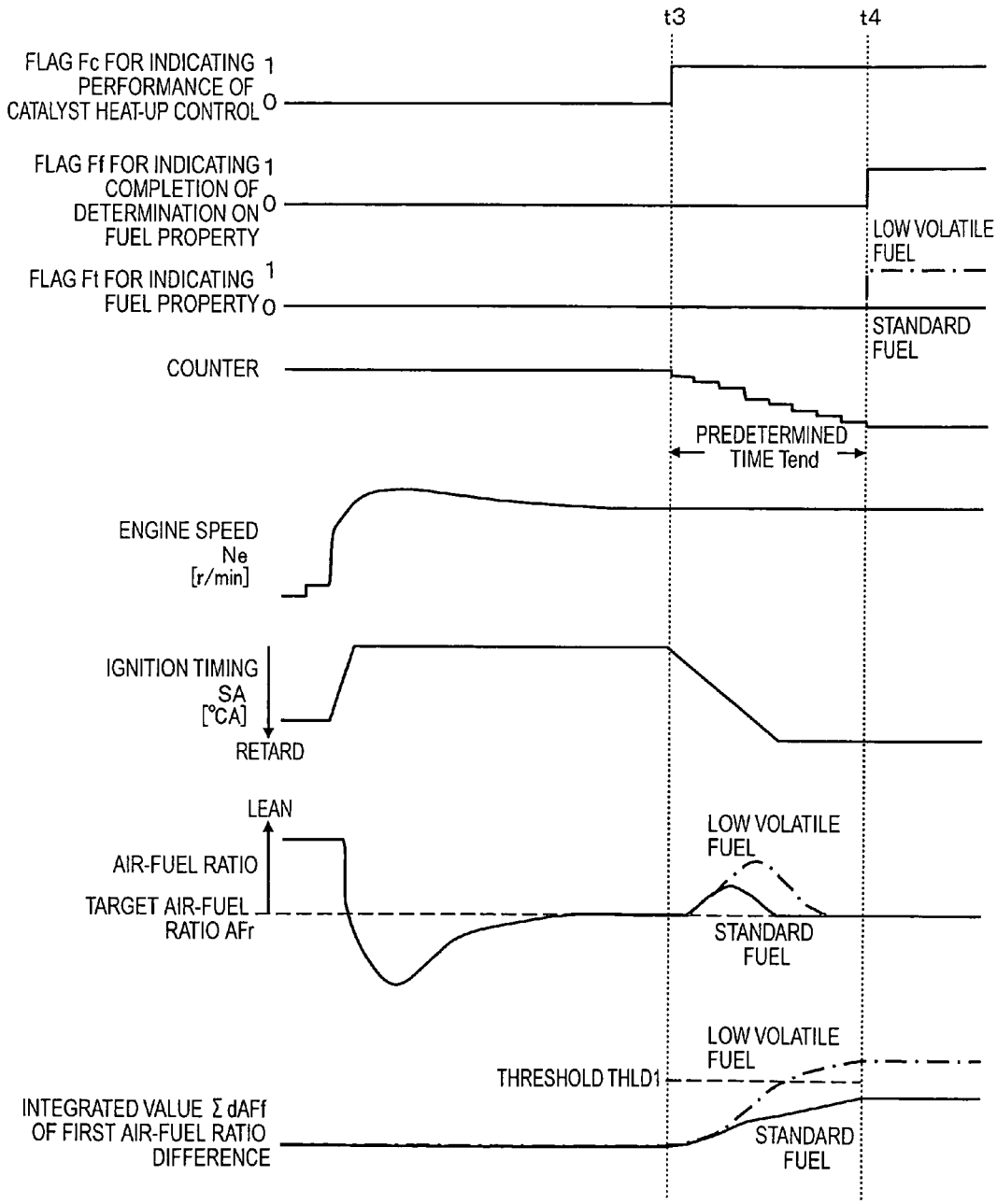
FIG. 7 is a timing chart showing how the fuel property determining means of the ECU according to the first embodiment of the present invention operates to make a determination on fuel property.

The operation of making a determination on fuel property, which has been described hitherto, will now be described in detail with reference to a timing chart of FIG. 7.

First of all, the flag Fc for indicating the performance of catalyst heat-up control is set to "1" at a time point t3 after cold start of the engine 1, so catalyst heat-up control, namely, the control for retarding the ignition timing is started.

As soon as catalyst heat-up control is started, "0" is assigned to the integrated value ΣdAFf of the first air-fuel ratio difference as an initial value. The first air-fuel ratio difference dAFf is newly integrated to calculate the integrated value ΣdAFf of the first air-fuel ratio difference.

The integrated value ΣdAFf of the first air-fuel ratio difference is then compared with the threshold THLD1 at a time point t4, namely, after the lapse of the predetermined time Tend since the start of catalyst heat-up control, to make a determination on fuel property.

When it is determined because of a standard fuel property that standard fuel is in use, the fuel adherent to a region close to the intake port 7 evaporates well. Thus, the air-fuel ratio has a small lean spike resulting from the control for retarding the ignition timing, so the integrated value ΣdAFf of the first air-fuel ratio difference does not exceed the threshold THLD1.

On the other hand, when it is determined because of a low volatile fuel property that low volatile fuel is in use, the adherent fuel does not evaporate well. Thus, the air-fuel ratio has a large lean spike, so the integrated value ΣdAFf of the first air-fuel ratio difference exceeds the threshold THLD1.

In the control apparatus for the internal combustion engine according to the first embodiment of the present invention, the catalyst heat-up control means performs the control for retarding the timing for igniting fuel after cold start of the engine 1, thereby creating a transient operational state. At this moment, the integrated value ΣdAFf of the first air-fuel ratio difference is calculated from the air-fuel ratio of exhaust gas, which has been made lean, and then is compared with the threshold THLD1 to make a determination on fuel property.

Thus, the determination on fuel property can be made with high accuracy without causing a cost increase.

That is, when the determination on fuel property is made based on fluctuations in the air-fuel ratio during normal acceleration or deceleration, the amount of the air sucked into the cylinder 2 differs depending on how much the driver has depressed the accelerator pedal. Therefore, it is difficult to make an accurate determination on fuel property.

Conversely, while catalyst heat-up control is performed, the amount of the air sucked into the cylinder 2 is determined through the control of the throttle valve control means regardless of how much the driver has depressed the accelerator pedal. Therefore, the amount of the air sucked into the cylinder 2 stabilizes. Consequently, the accuracy in making a determination on fuel property through the fuel property determining means can be enhanced significantly.

The fuel injection amount changeover means makes a changeover in fuel injection amount based on a result of the determination made on fuel property. Therefore, an improvement in driveability can be achieved, and exhaust gas can be kept clean.

The threshold THLD1 is set based on the coolant temperature Tw, so the threshold THLD1 corresponding to the temperature of the region close to the intake port 7, to which fuel has adhered, can be set. Therefore, the determination on fuel property can be made with high accuracy irrespective of the cold state of the engine 1.

In the foregoing first embodiment of the present invention, the target air-fuel ratio AFr in the air-fuel ratio F/B correction means is set as the reference air-fuel ratio. However, a fixed value such as the stoichiometric air-fuel ratio may be set as the reference air-fuel ratio instead.

In this case, the determination on fuel property can be made even when the air-fuel ratio F/B correction means is dispensed with.

Second Embodiment

In the foregoing first embodiment of the present invention, the integrated value ΣdAFf of the first air-fuel ratio difference as the integrated value of the first air-fuel ratio difference dAFf is compared with the threshold THLD1 to make a determination on fuel property. However, the method of making a determination on fuel property is not limited thereto.

The fuel property determining means may calculate an average of the air-fuel ratio AF and make a determination on fuel property based on a difference between the average air-fuel ratio and the actual air-fuel ratio AF.

Processings of calculating an average of the air-fuel ratio AF, and making a determination on fuel property based on a difference between the average air-fuel ratio and the actual air-fuel ratio AF will be described hereinafter.

Average air-fuel ratio calculating means and a second air-fuel ratio difference integrating means are stored in the memory of the ECU 20 as pieces of software, instead of the first air-fuel ratio difference integrating means described in the first embodiment of the present invention.

The average air-fuel ratio calculating means calculates an average of the air-fuel ratio AF immediately before the start of catalyst heat-up control, and outputs an average air-fuel ratio AFave.

The second air-fuel ratio difference calculating means integrates a second air-fuel ratio difference dAFs which is a difference between the air-fuel ratio AF detected by the air-fuel ratio detecting means and the average air-fuel ratio AFave, until the lapse of a predetermined time since the start of catalyst heat-up control, and outputs an integrated value ΣdAFs of the second air-fuel ratio difference.

Other configurational details of a second embodiment of the present invention are identical to those of the first embodiment of the present invention and thus will not be described below.

Figure 8:
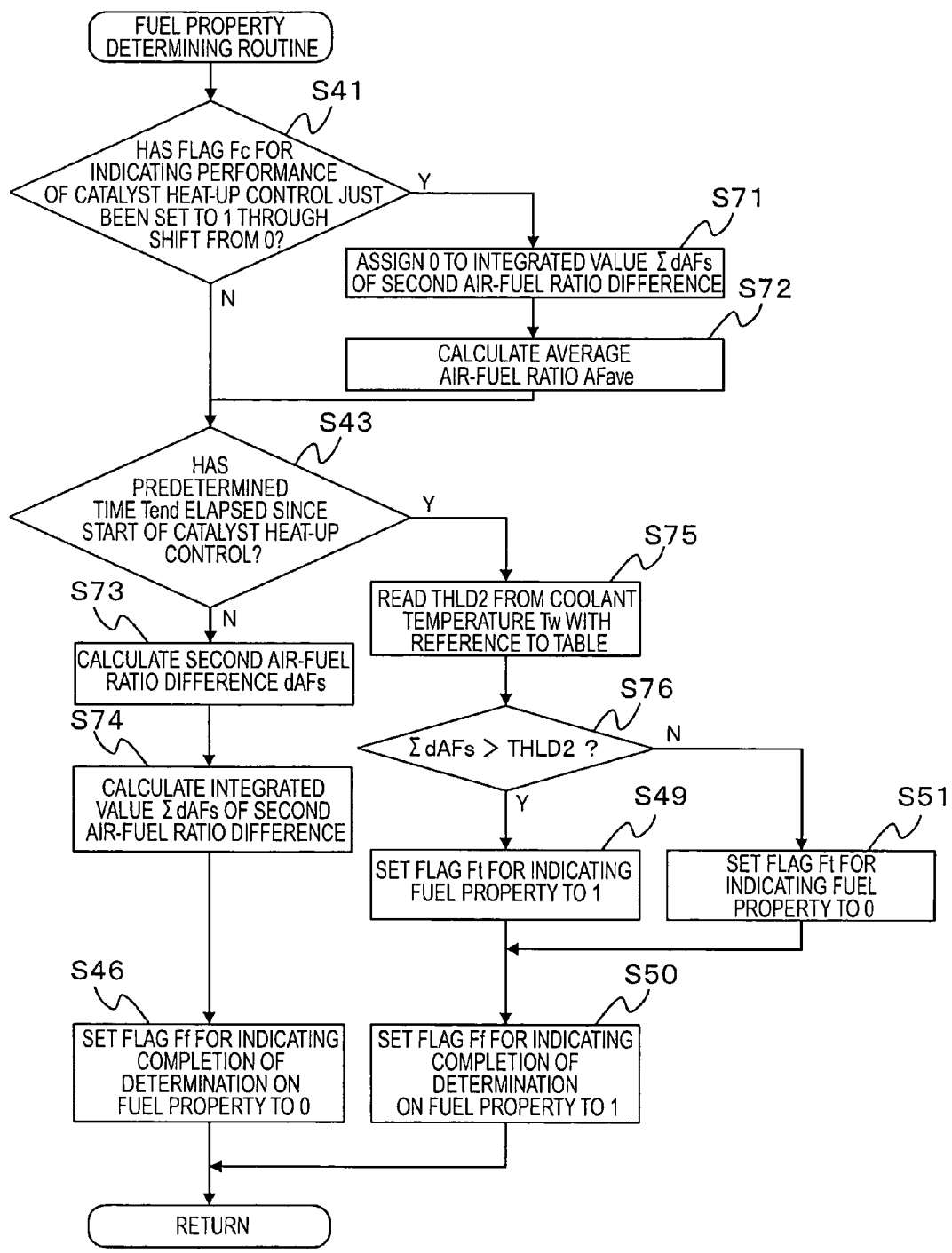
FIG. 8 is a flowchart showing how fuel property determining means of an ECU according to a second embodiment of the present invention operates to make a determination on fuel property.

An operation of the fuel property determining means according to the second embodiment of the present invention in making a determination on fuel property will be described in detail hereinafter with reference to a flowchart of FIG. 8. Processings identical to those of the first embodiment of the present invention will not be described below.

First of all, when it is determined in Step S41 that the flag Fc for indicating the performance of catalyst heat-up control has just been set to "1" through a shift from "0" (i.e., Yes), "0" is assigned to the integrated value ΣdAFs of the second air-fuel ratio difference as an initial value (Step S71), and the average air-fuel ratio AFave is calculated (Step S72).

In Step S72, given that n represents a number of times of sampling, the average air-fuel ratio AFave is expressed by an equation (3) shown below.

$$AFave = (AF[1] + AF[2] + \ldots + AF[n-1] + AF[n])/n \quad (3)$$

It should be noted herein that n air-fuel ratios AF[n] are detected in different routines respectively and then stored into the memory. For instance, given that the air-fuel ratio AF[1] represents a current air-fuel ratio AF, the air-fuel ratio AF[n] represents an air-fuel ratio AF detected in a fuel property determining routine that is performed n times prior to the current fuel property determining routine. Every time an air-fuel ratio AF is detected, the air-fuel ratios AF[1] to AF[n] are updated. When the engine 1 is started, "0" is assigned to the average air-fuel ratio AFave and the air-fuel ratios AF[1] to AF[n] as initial values.

When it is determined in Step S43 that the predetermined time Tend has not elapsed (i.e., No), the second air-fuel ratio difference integrating means calculates the second air-fuel ratio difference dAFs (Step S73).

In Step S73, the second air-fuel ratio difference dAFs is expressed by an equation (4) shown below.

$$dAFs = AF - AFave \quad (4)$$

Then, the second air-fuel ratio difference integrating means calculates an integrated value ΣdAFs of the second air-fuel ratio difference (Step S74).

In Step S74, given that [n], [n−1], and Δt represent a current value, a last value, and a calculation cycle respectively, the integrated value ΣdAFs of the second air-fuel ratio difference is expressed by an equation (5) shown below.

$$\Sigma dAFs[n] = \Sigma dAFs[n-1] + dAFs \times \Delta t \quad (5)$$

Figure 9:
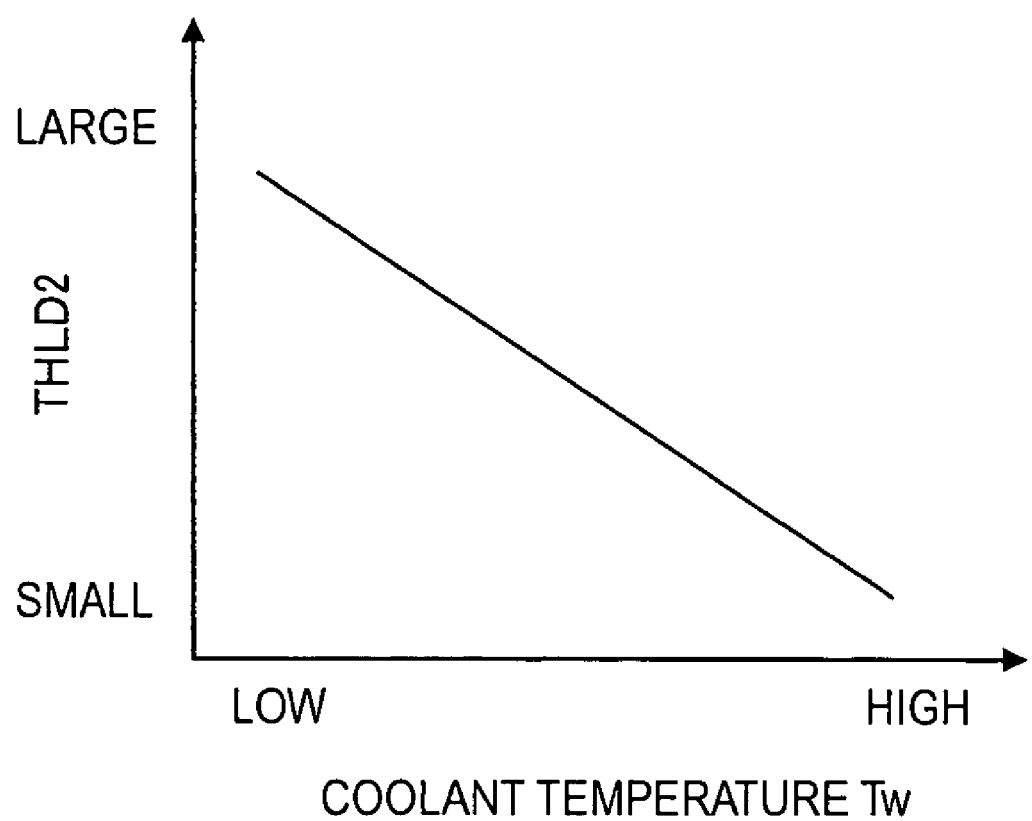
FIG. 9 is an explanatory diagram showing a relationship between a coolant temperature and a threshold in the determination on fuel property shown in FIG. 8.

On the other hand, when it is determined in Step S43 that the predetermined time Tend has elapsed (i.e., Yes), a threshold THLD2 (a reference value) is read from the coolant temperature Tw with reference to, for example, a table shown in FIG. 9 (Step S75).

It is then determined whether or not the integrated value ΣdAFs of the second air-fuel ratio difference is larger than the threshold THLD2 (Step S76).

When it is determined in Step S76 that the integrated value ΣdAFs of the second air-fuel ratio difference is larger than the threshold THLD2 (i.e., Yes), the flag Ft for indicating fuel property is set to "1" (Step S49). The flag Ff for indicating the completion of the determination on fuel property is then set to "1" (Step S50), and a return to the subroutine of catalyst heat-up control is made.

On the other hand, when it is determined in Step S76 that the integrated value ΣdAFs of the second air-fuel ratio difference is equal to or smaller than the threshold THLD2 (i.e., No), the flag Ft for indicating fuel property is set to "0" (Step S51). The flag Ff for indicating the completion of the determination on fuel property is then set to "1" (Step S50), and a return to the subroutine of catalyst heat-up control is made.

Figure 10:
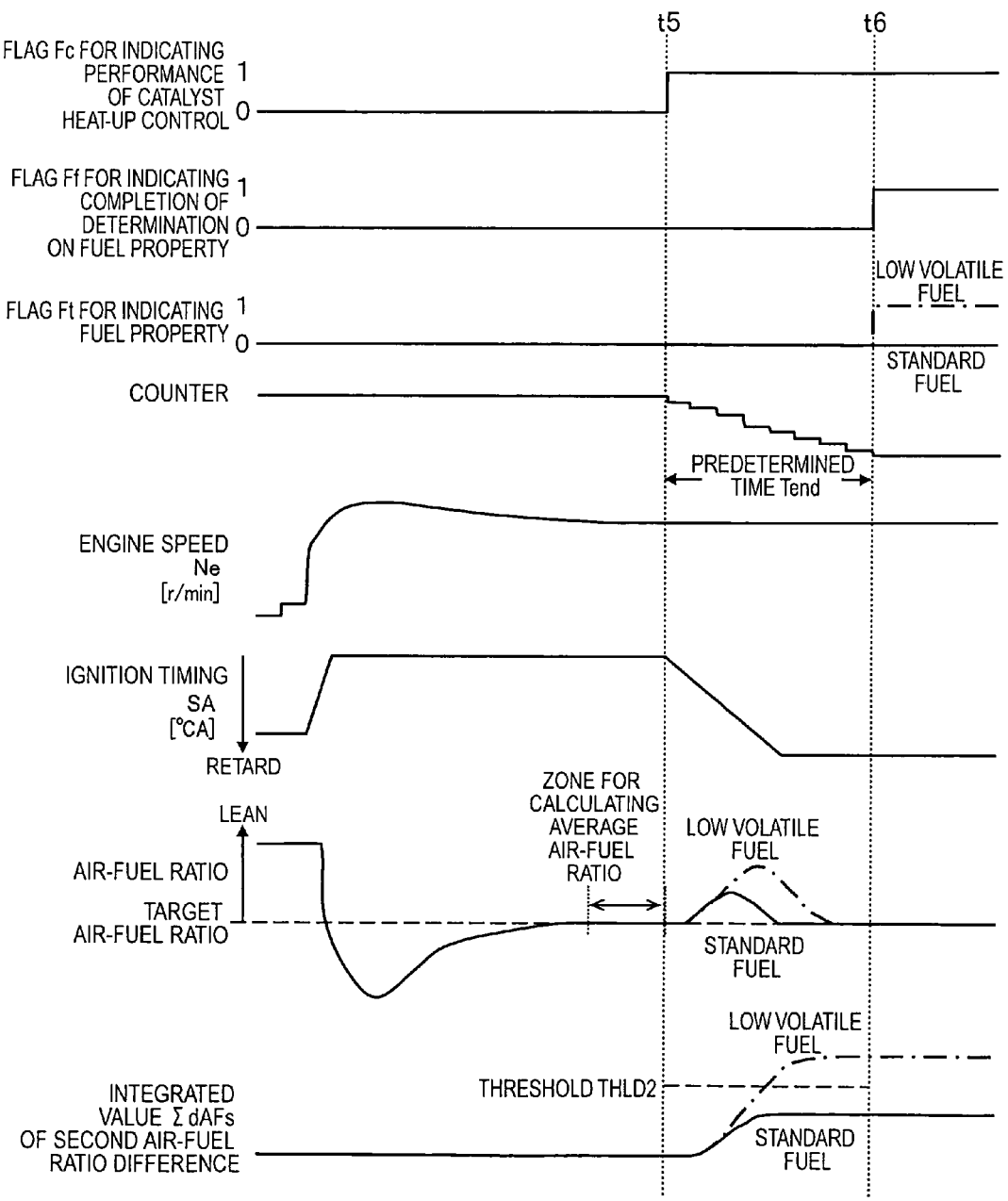
FIG. 10 is a timing chart showing how the fuel property determining means of the ECU according to the second embodiment of the present invention operates to make a determination on fuel property.

The operation of making a determination on fuel property, which has been described hitherto, will now be described in detail with reference to a timing chart of FIG. 10.

First of all, the flag Fc for indicating the performance of catalyst heat-up control is set to "1" at a time point t5 after cold start of the engine 1, so catalyst heat-up control, namely, the control for retarding the ignition timing is started.

As soon as catalyst heat-up control is started, "0" is assigned to the integrated value ΣdAFs of the second air-fuel ratio difference. The average air-fuel ratio AFave is used to calculate the integrated value ΣdAFs of the second air-fuel ratio difference.

The integrated value ΣdAFs of the second air-fuel ratio difference is then compared with the threshold THLD2 at a time point t6, namely, after the lapse of the predetermined time Tend since the start of catalyst heat-up control, to make a determination on fuel property.

When it is determined because of a standard fuel property that standard fuel is in use, the fuel adherent to a region close to the intake port 7 evaporates well. Thus, the air-fuel ratio has a small lean spike resulting from the control for retarding the ignition timing, so the integrated value ΣdAFs of the second air-fuel ratio difference does not exceed the threshold THLD2.

On the other hand, when it is determined because of a low volatile fuel property that low volatile fuel is in use, the adherent fuel does not evaporate well. Thus, the air-fuel ratio has a large lean spike, so the integrated value ΣdAFs of the second air-fuel ratio difference exceeds the threshold THLD2.

In the control apparatus for the internal combustion engine according to the second embodiment of the present invention, the integrated value ΣdAFs of the second air-fuel ratio difference is compared with the threshold THLD2 to make a determination on fuel property, using the average air-fuel ratio AFave, which has been obtained by calculating the average of the air-fuel ratio AF immediately before the determination on fuel property is made.

Thus, only the influence of a lean spike of the air-fuel ratio resulting from the control for retarding the ignition timing can be detected. Therefore, the determination on fuel property can be made with higher accuracy.

In the foregoing second embodiment of the present invention, the value based on moving average is used as the average air-fuel ratio AFave. However, the average air-fuel ratio AFave acquisition method is not limited thereto. The average air-fuel ratio AF may be calculated through a filter calculation indicated by an equation (6) shown below.

$$AFave[n]=AFave[n-1]\times K+AF[n]\times(1-K) \quad (6)$$

It should be noted in the equation (6) that $0 \leq K \leq 1$.

In this case as well, an effect similar to that of the foregoing second embodiment of the present invention can be achieved.

Third Embodiment

In the foregoing first embodiment of the present invention, the integrated value $\Sigma dAFf$ of the first air-fuel ratio difference as the integrated value of the first air-fuel ratio difference dAFf is compared with the threshold THLD1 to make a determination on fuel property. However, the method of making a determination on fuel property is not limited thereto.

The fuel property determining means may integrate an air-fuel ratio F/B correction amount AFFB and make a determination on fuel property based on an integrated value.

Processings of integrating an air-fuel ratio F/B correction amount AFFB and making a determination on fuel property based on an integrated value will be described hereinafter.

Air-fuel ratio F/B correction amount integrating means is stored in the memory of the ECU 20 as a piece of software, instead of the first air-fuel ratio difference integrating means described in the first embodiment of the present invention.

The air-fuel ratio F/B correction amount integrating means integrates the air-fuel ratio F/B correction amount AFFB output from the air-fuel ratio F/B correction means, and outputs an integrated value $\Sigma AFFB$ of the air-fuel ratio F/B correction amount.

Other configurational details of a third embodiment of the present invention are identical to those of the first embodiment of the present invention and thus will not be described below.

Figure 11:
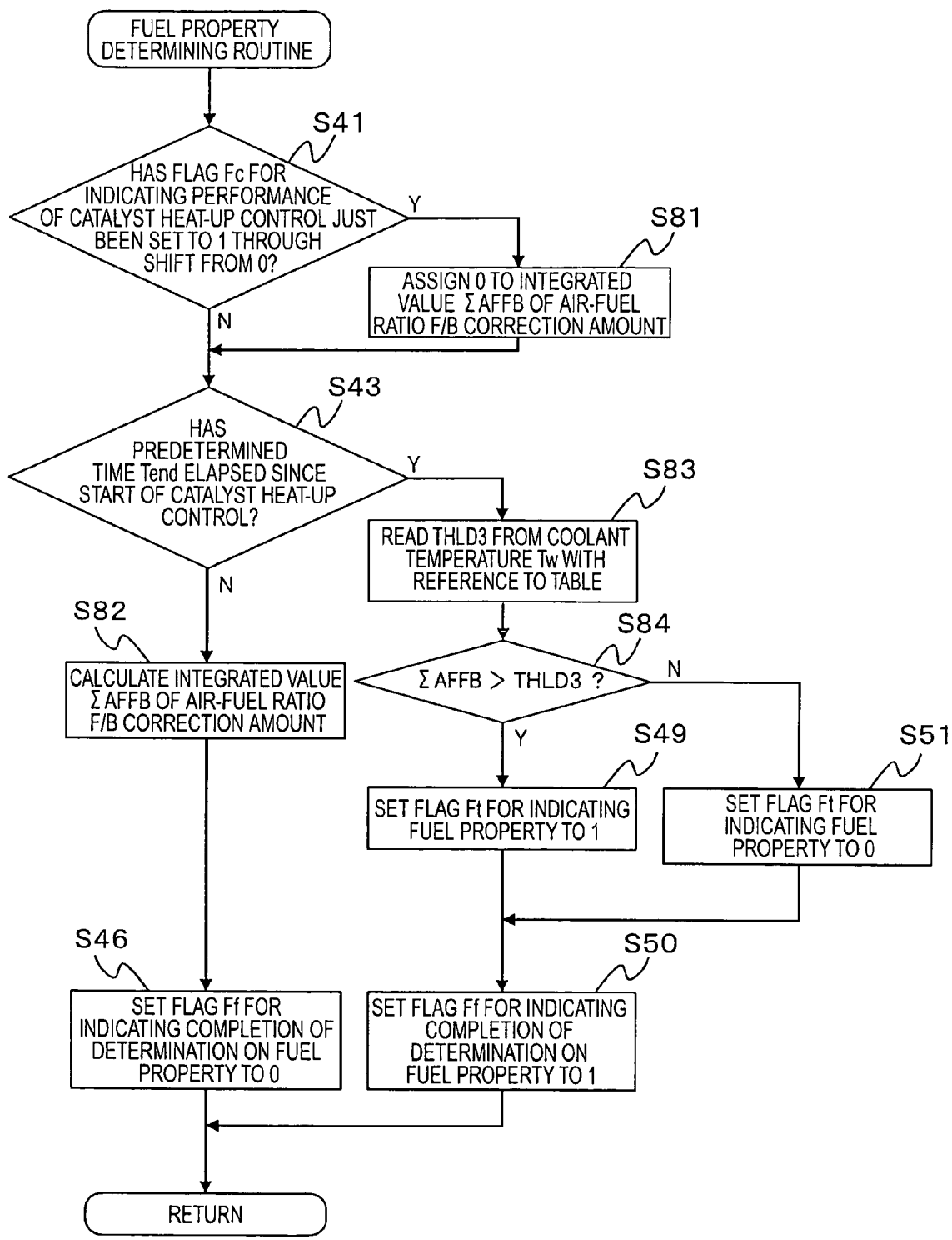
FIG. 11 is a flowchart showing how fuel property determining means of an ECU according to a third embodiment of the present invention operates to make a determination on fuel property.

An operation of the fuel property determining means according to the third embodiment of the present invention in making a determination on fuel property will be described in detail hereinafter with reference to a flowchart of FIG. 11. Processings identical to those of the first embodiment of the present invention will not be described below.

First of all, when it is determined in Step S41 that the flag Fc for indicating the performance of catalyst heat-up control has just been set to "1" through a shift from "0" (i.e., Yes), "0" is assigned to the integrated value $\Sigma AFFB$ of the air-fuel ratio F/B correction amount as an initial value (Step S81).

Then, when it is determined in Step S43 that the predetermined time Tend has not elapsed (i.e., No), the air-fuel ratio F/B correction amount integrating means calculates the integrated value $\Sigma AFFB$ of the air-fuel ratio F/B correction amount (Step S82).

In Step S82, given that [n], [n−1], and $\Delta t$ represent a current value, a last value, and a calculation cycle respectively, the integrated value $\Sigma AFFB$ of the air-fuel ratio F/B correction amount is expressed by an equation (7) shown below.

$$\Sigma AFFB[n]=\Sigma AFFB[n-1]+AFFB\times\Delta t \quad (7)$$

Figure 12:
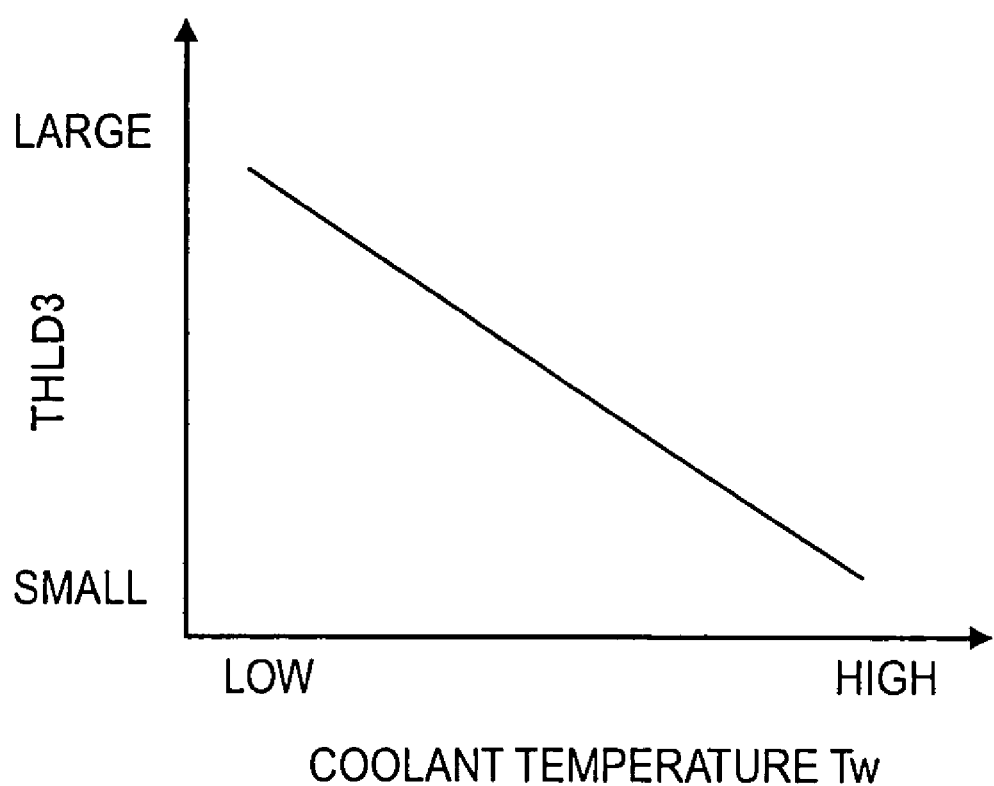
FIG. 12 is an explanatory diagram showing a relationship between a coolant temperature and a threshold in the determination on fuel property shown in FIG. 11.

On the other hand, when it is determined in Step S43 that the predetermined time Tend has elapsed (i.e., Yes), a threshold THLD3 (a reference value) is read from the coolant temperature Tw with reference to, for example, a table shown in FIG. 12 (Step S83).

It is then determined whether or not the integrated value $\Sigma AFFB$ of the air-fuel ratio F/B correction amount is larger than the threshold THLD3 (Step S84).

When it is determined in Step S84 that the integrated value $\Sigma AFFB$ of the air-fuel ratio F/B correction amount is larger than the threshold THLD3 (i.e., Yes), the flag Ft for indicating fuel property is set to "1" (Step S49). The flag Ff for indicating the completion of the determination on fuel property is then set to "1" (Step S50), and a return to the subroutine of catalyst heat-up control is made.

On the other hand, when it is determined in Step S84 that the integrated value $\Sigma AFFB$ of the air-fuel ratio F/B correction amount is equal to or smaller than the threshold THLD3 (i.e., No), the flag Ft for indicating fuel property is set to "0" (Step S51). The flag Ff for indicating the completion of the determination on fuel property is then set to "1" (Step S50), and a return to the subroutine of catalyst heat-up control is made.

Figure 13:
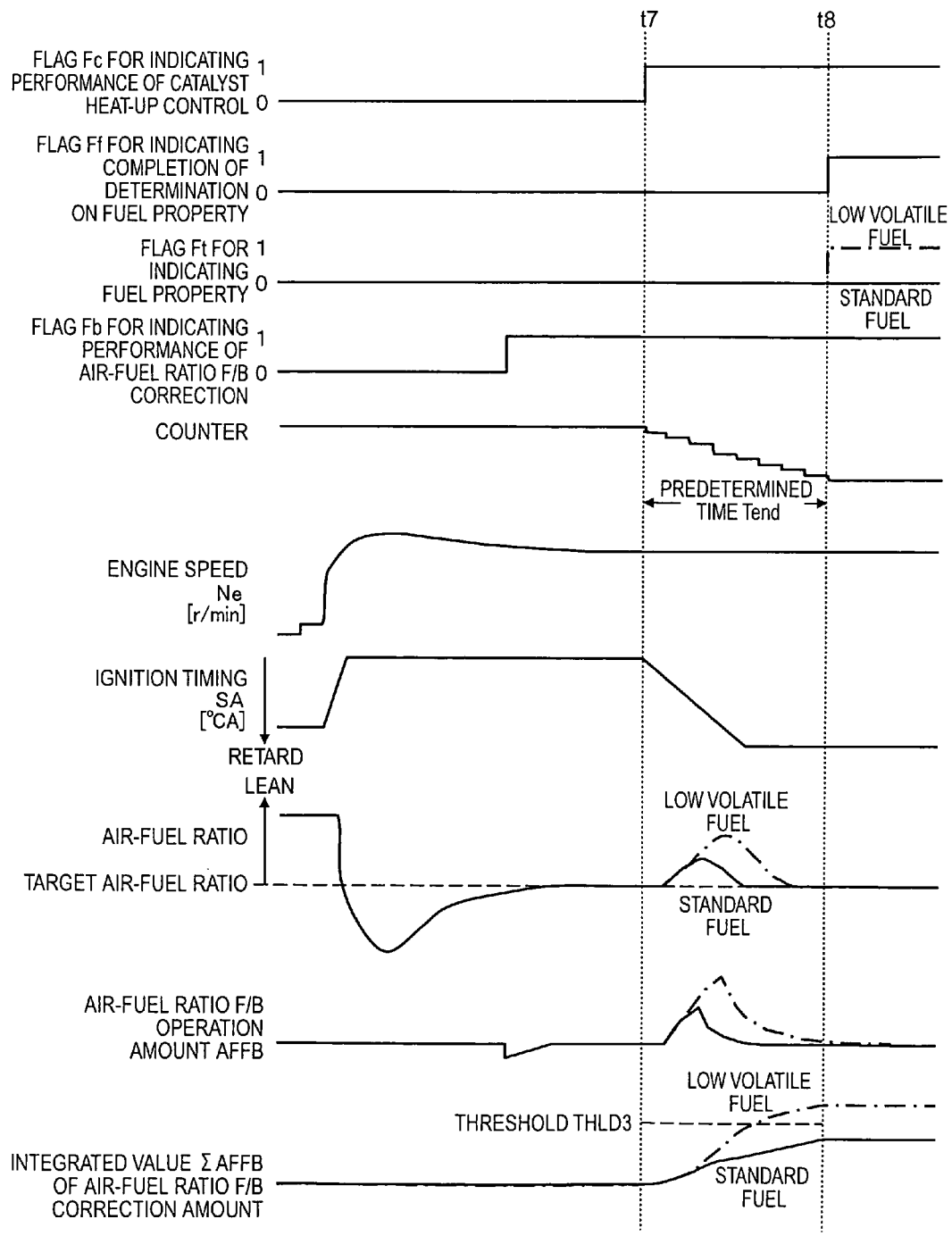
FIG. 13 is a timing chart showing how the fuel property determining means of the ECU according to the third embodiment of the present invention operates to make a determination on fuel property.

The operation of making a determination on fuel property, which has been described hitherto, will now be described in detail with reference to a timing chart of FIG. 13.

First of all, when the LAFS 19 is activated after cold start of the engine 1, a flag Fb for indicating the performance of air-fuel ratio F/B correction is set to "1" to start air-fuel ratio F/B correction.

Then, at a time point t7 after the start of air-fuel ratio F/B correction, the flag Fc for indicating the performance of catalyst heat-up control is set to "1" to start catalyst heat-up control, namely, the control for retarding the ignition timing.

As soon as catalyst heat-up control is started, "0" is assigned to the integrated value $\Sigma AFFB$ of the air-fuel ratio F/B correction amount as an initial value. The integrated value $\Sigma AFFB$ of the air-fuel ratio F/B correction amount is then newly calculated.

The integrated value $\Sigma AFFB$ of the air-fuel ratio F/B correction amount is then compared with the threshold THLD3 at a time point t8, namely, after the lapse of the predetermined time Tend since the start of catalyst heat-up control, to make a determination on fuel property.

When it is determined because of a standard fuel property that standard fuel is in use, the fuel adherent to a region close to the intake port 7 evaporates well. Thus, the air-fuel ratio F/B correction amount AFFB becomes small, so the integrated value $\Sigma AFFB$ of the air-fuel ratio F/B correction amount does not exceed the threshold THLD3.

On the other hand, when it is determined because of a low volatile fuel property that low volatile fuel is in use, the adherent fuel does not evaporate well. Thus, the air-fuel ratio F/B correction amount AFFB becomes large, so the integrated value $\Sigma AFFB$ of the air-fuel ratio F/B correction amount exceeds the threshold THLD3.

With the control apparatus for the internal combustion engine according to the third embodiment of the present invention, an effect similar to that of the foregoing first embodiment of the present invention is achieved.

Fourth Embodiment

In the foregoing first embodiment of the present invention, the integrated value $\Sigma dAFf$ of the first air-fuel ratio difference as the integrated value of the first air-fuel ratio difference dAFf is compared with the threshold THLD1 to make a determination on fuel property. However, the method of making a determination on fuel property is not limited thereto.

The fuel property determining means may detect a lean peak of the air-fuel ratio AF and make a determination on fuel property based on an air-fuel ratio lean peak value.

Processings of detecting a lean peak of the air-fuel ratio AF and making a determination on fuel property based on an air-fuel ratio lean peak value will be described hereinafter.

Air-fuel ratio lean peak detecting means is stored in the memory of the ECU 20 as a piece of software, instead of the first air-fuel ratio difference integrating means described in the first embodiment of the present invention.

The air-fuel ratio lean peak detecting means detects a lean peak of the air-fuel ratio AF, and outputs an air-fuel ratio lean peak value AFp.

Other configurational details of a fourth embodiment of the present invention are identical to those of the first embodiment of the present invention and thus will not be described below.

Figure 14:
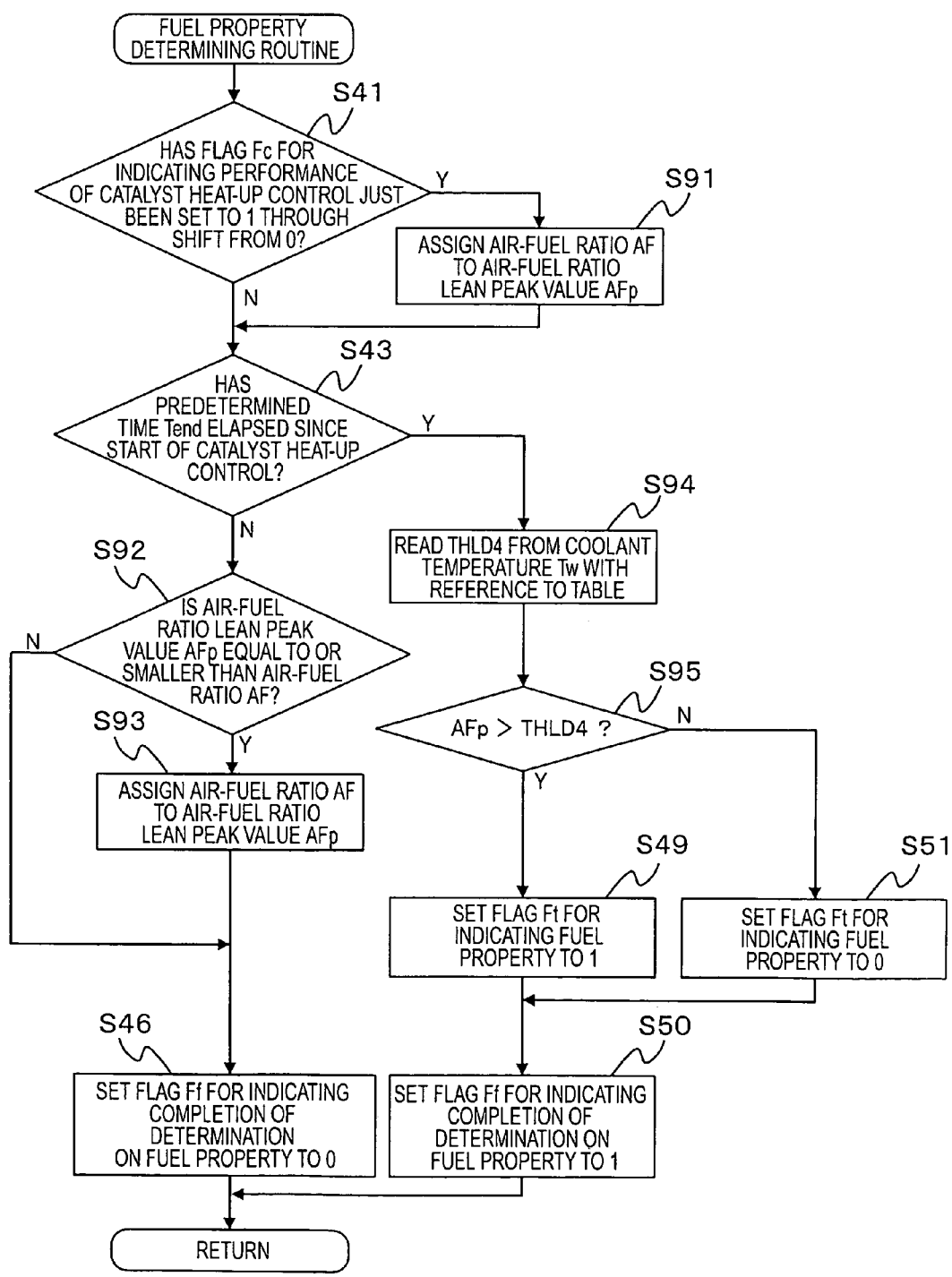
FIG. 14 is a flowchart showing how fuel property determining means of an ECU according to a fourth embodiment of the present invention operates to make a determination on fuel property.

An operation of the fuel property determining means according to the fourth embodiment of the present invention in making a determination on fuel property will be described in detail hereinafter with reference to a flowchart of FIG. 14. Processings identical to those of the first embodiment of the present invention will not be described below.

First of all, when it is determined in Step S41 that the flag Fc for indicating the performance of catalyst heat-up control has just been set to "1" through a shift from "0" (i.e., Yes), the air-fuel ratio AF at the time point corresponding to the start of catalyst heat-up control is assigned to the air-fuel ratio lean peak value AFp as an initial value (Step S91).

Then, when it is determined in Step S43 that the predetermined time Tend has not elapsed (i.e., No), it is determined whether or not the air-fuel ratio lean peak value AFp up to the present is equal to or smaller than the air-fuel ratio AF output from the LAFS 19 (Step S92).

When it is determined in Step S92 that the air-fuel ratio lean peak value AFp is equal to or smaller than the air-fuel ratio AF (i.e., Yes), the value of the current air-fuel ratio AF is assigned to the air-fuel ratio lean peak value AFp (Step S93). Then, a transition to Step S46 is made.

On the other hand, when it is determined in Step S92 that the air-fuel ratio lean peak value AFp is not equal to or smaller than the air-fuel ratio AF (i.e., No), the transition to Step S46 is made immediately.

Figure 15:
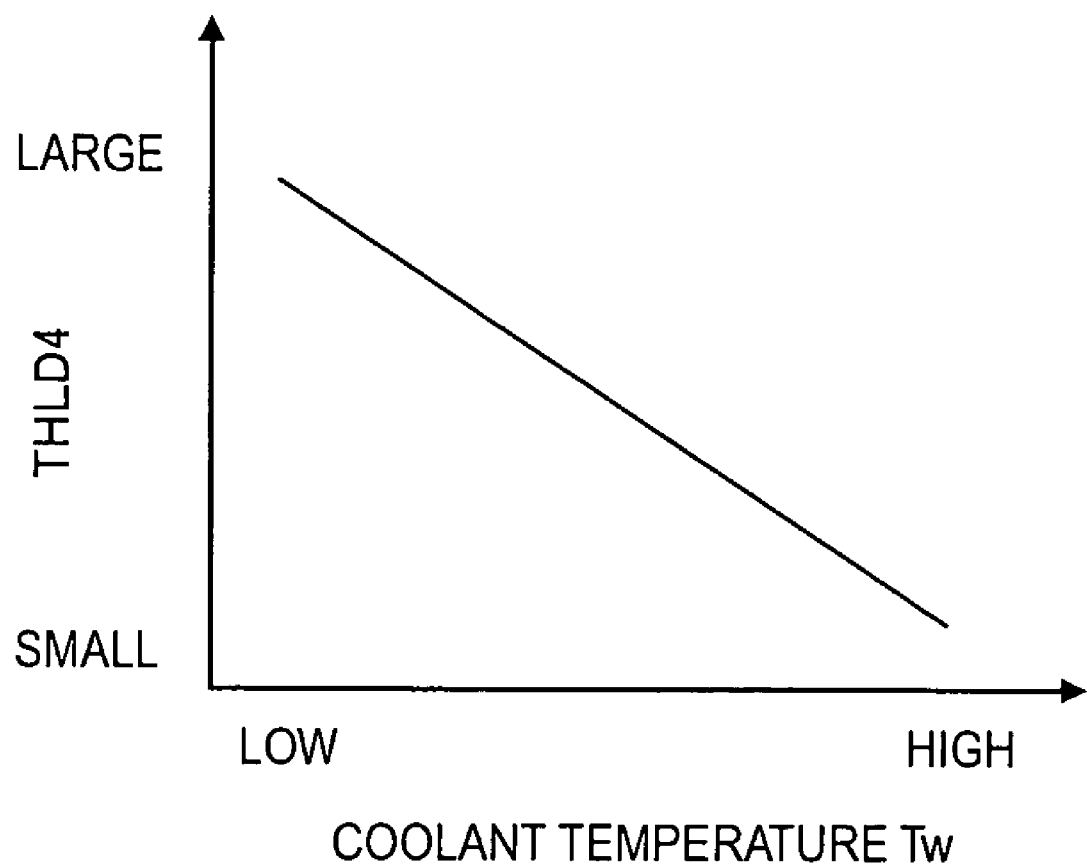
FIG. 15 is an explanatory diagram showing a relationship between a coolant temperature and a threshold in the determination on fuel property shown in FIG. 14.

On the other hand, when it is determined in Step S43 that the predetermined time Tend has elapsed (i.e., Yes), a threshold THLD4 (a reference value) is read from the coolant temperature Tw with reference to, for example, a table shown in FIG. 15 (Step S94).

It is then determined whether or not the air-fuel ratio lean peak value AFp is larger than the threshold THLD4 (Step S95).

When it is determined in Step S95 that the air-fuel ratio lean peak value AFp is larger than the threshold THLD4 (i.e., Yes), the flag Ft for indicating fuel property is set to "1" (Step S49). The flag Ff for indicating the completion of the determination on fuel property is then set to "1" (Step S50), and a return to the subroutine of catalyst heat-up control is made.

On the other hand, when it is determined in Step S95 that air-fuel ratio lean peak value AFp is equal to or smaller than the threshold THLD4 (i.e., No), the flag Ft for indicating fuel property is set to "0" (Step S51). The flag Ff for indicating the completion of the determination on fuel property is then set to "1" (Step S50), and a return to the subroutine of catalyst heat-up control is made.

Figure 16:
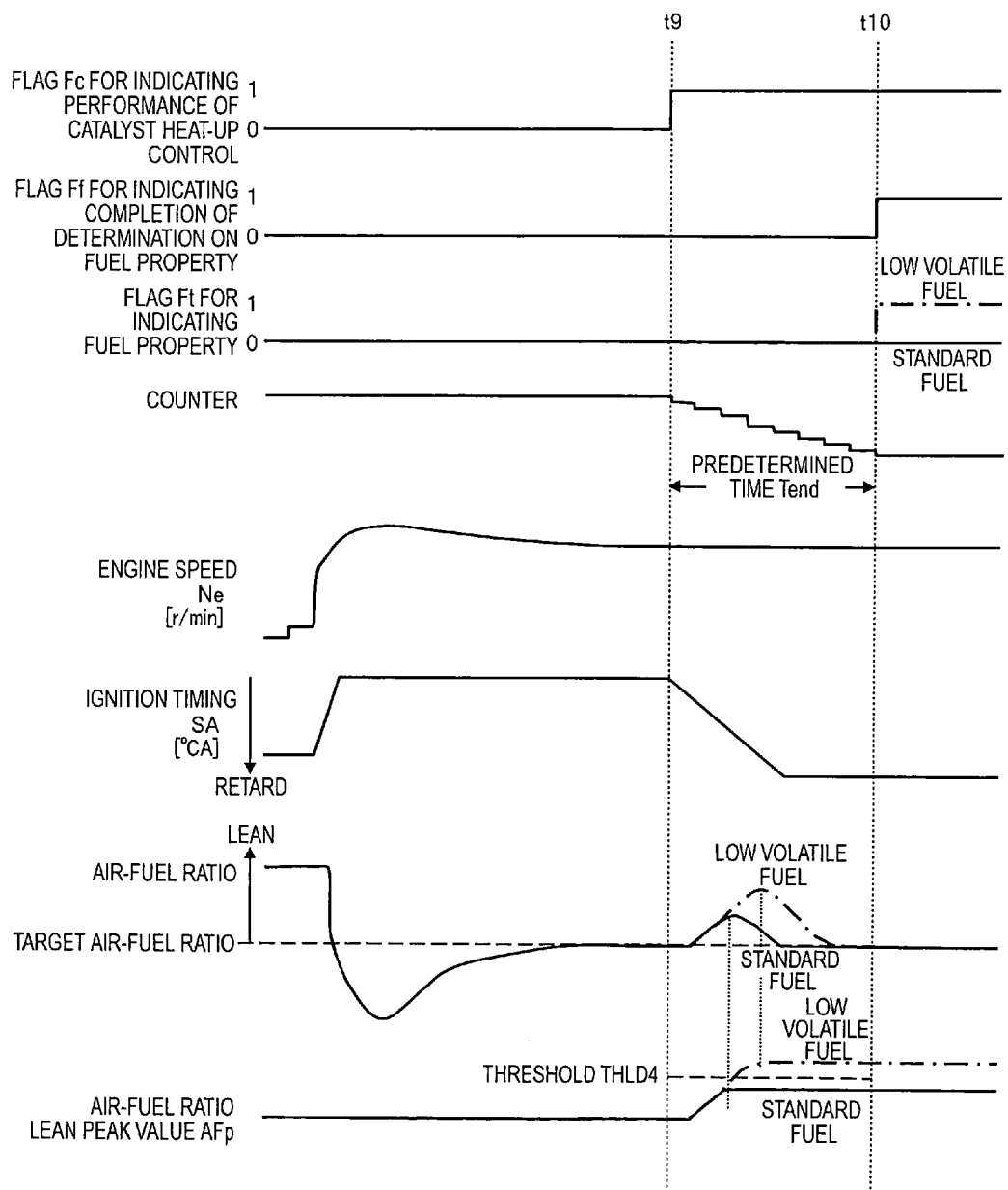
FIG. 16 is a timing chart showing how the fuel property determining means of the ECU according to the fourth embodiment of the present invention operates to make a determination on fuel property.

The operation of making a determination on fuel property, which has been described hitherto, will now be described in detail with reference to a timing chart of FIG. 16.

First of all, at a time point t9 after cold start of the engine 1, the flag Fc for indicating the performance of catalyst heat-up control is set to "1" to start catalyst heat-up control, namely, the control for retarding the ignition timing.

As soon as catalyst heat-up control is started, the air-fuel ratio AF at the time point corresponding to the start of catalyst heat-up control is assigned to the air-fuel ratio lean peak value AFp as an initial value. When the air-fuel ratio AF output from the LAFS 19 is larger than the air-fuel ratio lean peak value AFp up to that time point, the air-fuel ratio lean peak value AFp is updated.

The air-fuel ratio lean peak value AFp is then compared with the threshold THLD4 at a time point t10, namely, after the lapse of the predetermined time Tend since the start of catalyst heat-up control, to make a determination on fuel property.

When it is determined because of a standard fuel property that standard fuel is in use, the fuel adherent to a region close to the intake port 7 evaporates well. Thus, the air-fuel ratio lean peak value AFp becomes small, so the air-fuel ratio lean peak value AFp does not exceed the threshold THLD4.

On the other hand, when it is determined because of a low volatile fuel property that low volatile fuel is in use, the adherent fuel does not evaporate well. Thus, the air-fuel ratio lean peak value AFp becomes large, so the air-fuel ratio lean peak value AFp exceeds the threshold THLD4.

With the control apparatus for the internal combustion engine according to the fourth embodiment of the present invention, an effect similar to that of the foregoing first embodiment of the present invention is achieved.

Fifth Embodiment

In the foregoing first embodiment of the present invention, the integrated value $\Sigma dAFf$ of the first air-fuel ratio difference as the integrated value of the first air-fuel ratio difference dAFf is compared with the threshold THLD1 to make a determination on fuel property. However, the method of making a determination on fuel property is not limited thereto.

The fuel property determining means may detect an air-fuel ratio lean time in which the air-fuel ratio AF is leaner than the stoichiometric air-fuel ratio, and make a determination on fuel property based on the air-fuel ratio lean time.

Processings of detecting the air-fuel ratio lean time, in which the air-fuel ratio AF is leaner than the stoichiometric air-fuel ratio, and making a determination on fuel property based on the air-fuel ratio lean time will be described hereinafter.

In a fifth embodiment of the present invention, the stoichiometric air-fuel ratio is assumed to be, for example, 14.5, but should not be limited to this value. In the fifth embodiment of the present invention, the time in which the air-fuel ratio AF is leaner than the stoichiometric air-fuel ratio is defined as the air-fuel ratio lean time. However, a time in which the air-fuel ratio is leaner than an arbitrary reference air-fuel ratio set in advance may be defined as the air-fuel ratio lean time.

Air-fuel ratio lean time detecting means is stored in the memory of the ECU 20 as a piece of software, instead of the first air-fuel ratio difference integrating means described in the first embodiment of the present invention.

The air-fuel ratio lean time detecting means detects a time in which the air-fuel ratio AF is leaner than the stoichiometric air-fuel ratio, and outputs an air-fuel ratio lean time $\Sigma AFL$.

Other configurational details of the fifth embodiment of the present invention are identical to those of the first embodiment of the present invention and thus will not be described below.

Figure 17:
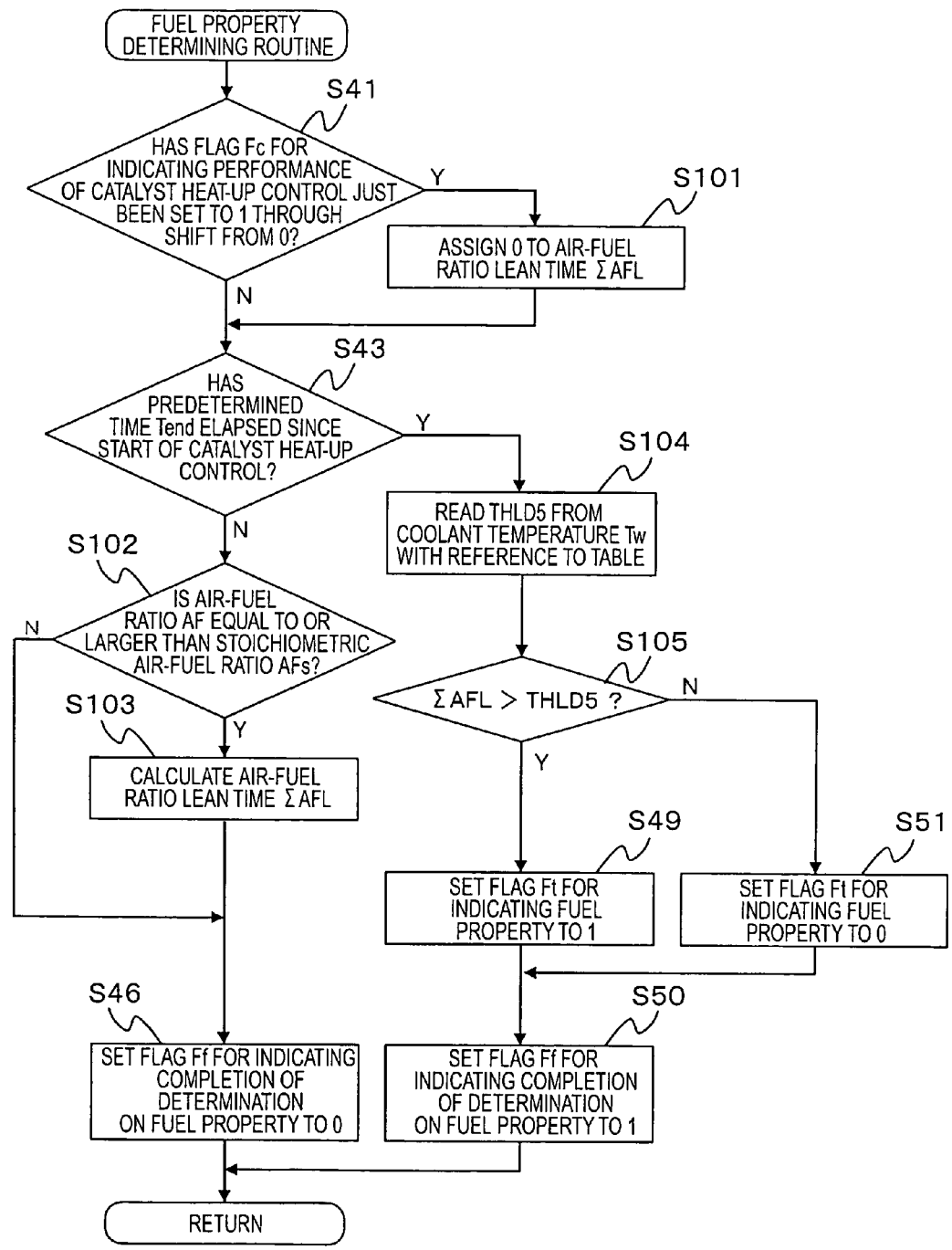
FIG. 17 is a flowchart showing how fuel property determining means of an ECU according to a fifth embodiment of the present invention operates to make a determination on fuel property.

An operation of the fuel property determining means according to the fifth embodiment of the present invention in making a determination on fuel property will be described in detail hereinafter with reference to a flowchart of FIG. 17. Processings identical to those of the first embodiment of the present invention will not be described below.

First of all, when it is determined in Step S41 that the flag Fc for indicating the performance of catalyst heat-up control has just been set to "1" through a shift from "0" (i.e., Yes), "0" is assigned to the air-fuel ratio lean time ΣAFL as an initial value (Step S101).

Then, when it is determined in Step S43 that the predetermined time Tend has not elapsed (i.e., No), it is determined whether or not the air-fuel ratio AF output from the LAFS 19 is equal to or larger than the stoichiometric air-fuel ratio (Step S102).

When it is determined in Step S102 that the air-fuel ratio AF is equal to or larger than the stoichiometric air-fuel ratio (i.e., Yes), the air-fuel ratio lean time detecting means calculates the air-fuel ratio lean time ΣAFL (Step S103). Then, a transition to Step S46 is made.

In Step S103, given that [n], [n−1], and Δt represent a current value, a last value, and a calculation cycle respectively, the air-fuel ratio lean time ΣAFL is expressed by an equation (8) shown below.

$$\Sigma AFL[n]=\Sigma AFL[n-1]+\Delta t \qquad (8)$$

On the other hand, when it is determined in Step S102 that the air-fuel ratio AF is not equal to or larger than the stoichiometric air-fuel ratio (i.e., No), the transition to Step S46 is made immediately.

Figure 18:
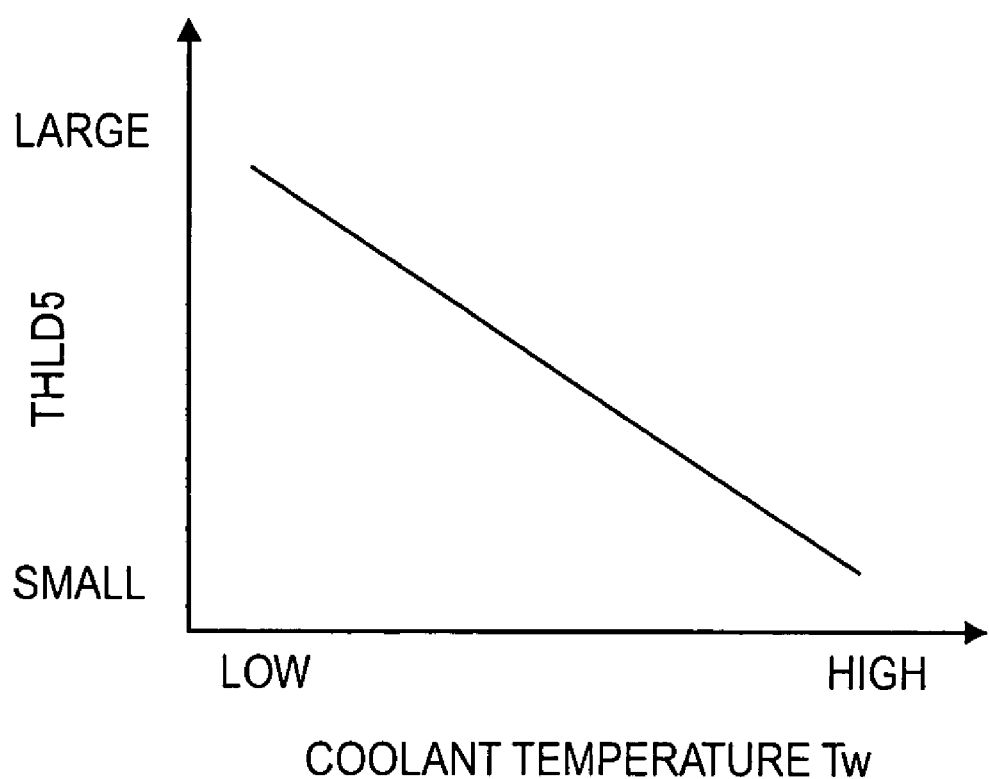
FIG. 18 is an explanatory diagram showing a relationship between a coolant temperature and a threshold in the determination on fuel property shown in FIG. 17.

On the other hand, when it is determined in Step S43 that the predetermined time Tend has elapsed (i.e., Yes), a threshold THLD5 (a reference value) is read from the coolant temperature Tw with reference to, for example, a table shown in FIG. 18 (Step S104).

It is then determined whether or not the air-fuel ratio lean time ΣAFL is larger than the threshold THLD5 (Step S105).

When it is determined in Step S105 that the air-fuel ratio lean time ΣAFL is larger than the threshold THLD5 (i.e., Yes), the flag Ft for indicating fuel property is set to "1" (Step S49). The flag Ff for indicating the completion of the determination on fuel property is then set to "1" (Step S50), and a return to the subroutine of catalyst heat-up control is made.

On the other hand, when it is determined in Step S105 that the air-fuel ratio lean time ΣAFL is equal to or smaller than the threshold THLD5 (i.e., No), the flag Ft for indicating fuel property is set to "0" (Step S51). The flag Ff for indicating the completion of the determination on fuel property is then set to "1" (Step S50), and a return to the subroutine of catalyst heat-up control is made.

Figure 19:
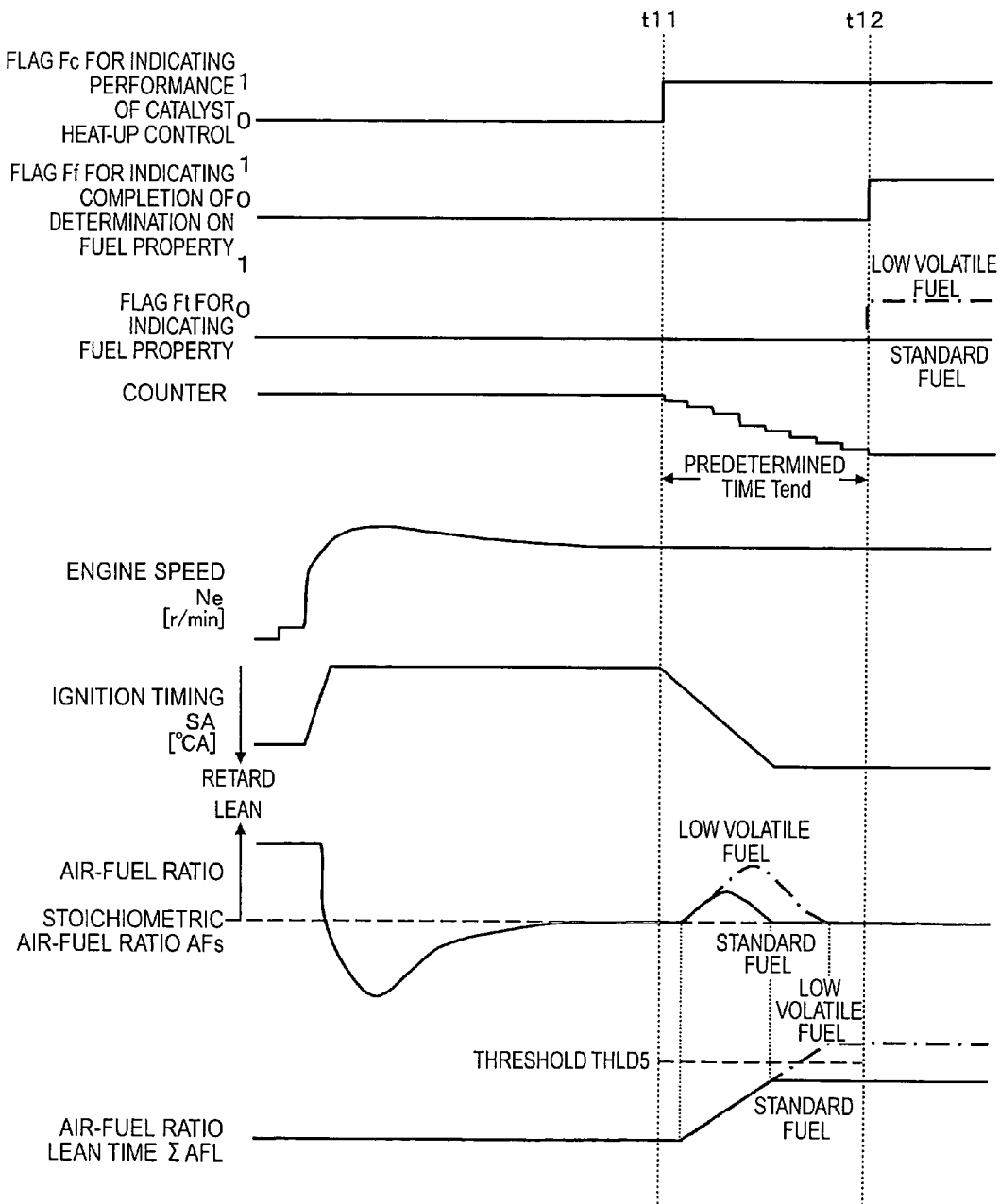
FIG. 19 is a timing chart showing how the fuel property determining means of the ECU according to the fifth embodiment of the present invention operates to make a determination on fuel property.

The operation of making a determination on fuel property, which has been described hitherto, will now be described in detail with reference to a timing chart of FIG. 19.

First of all, the flag Fc for indicating the performance of catalyst heat-up control is set to "1" at a time point t11 after cold start of the engine 1, so catalyst heat-up control, namely, the control for retarding the ignition timing is started.

As soon as catalyst heat-up control is started, "0" is assigned to the air-fuel ratio lean time ΣAFL as an initial value. The air-fuel ratio lean time ΣAFL is then newly calculated.

The air-fuel ratio lean time ΣAFL is then compared with the threshold THLD5 at a time point t12, namely, after the lapse of the predetermined time Tend since the start of catalyst heat-up control, to make a determination on fuel property.

When it is determined because of a standard fuel property that standard fuel is in use, the fuel adherent to a region close to the intake port 7 evaporates well. Thus, a period of time in which the air-fuel ratio AF exceeds the stoichiometric air-fuel ratio is shortened, so the air-fuel ratio lean time ΣAFL does not exceed the threshold THLD5.

On the other hand, when it is determined because of a low volatile fuel property that low volatile fuel is in use, the adherent fuel does not evaporate well. Thus, the period of time in which the air-fuel ratio AF exceeds the stoichiometric air-fuel ratio is lengthened, so the air-fuel ratio lean time ΣAFL exceeds the threshold THLD5.

With the control apparatus for the internal combustion engine according to the fifth embodiment of the present invention, an effect similar to that of the foregoing first embodiment of the present invention is achieved.

What is claimed is:

1. A control apparatus for an internal combustion engine, comprising:
   intake air amount control means for controlling an intake air amount of the internal combustion engine;
   ignition timing control means for controlling an ignition timing of the internal combustion engine;
   catalyst heat-up control means for increasing the intake air amount after cold start of the internal combustion engine and performing control for retarding the ignition timing;
   air-fuel ratio detecting means for detecting an air-fuel ratio of exhaust gas in the internal combustion engine; and
   fuel property determining means for making a determination on fuel property through a comparison between a parameter value calculated from the air-fuel ratio and a preset reference value when the catalyst heat-up control means performs the control for retarding the ignition timing,
   further comprising:
   fuel property storing means for storing a result of a determination made by the fuel property determining means: and
   fuel injection amount changeover means for making a changeover in a fuel injection amount based on the result of the determination,
   wherein the fuel injection amount changeover means increases the fuel injection amount when the result of the determination made by the fuel property determining means indicates low volatile fuel, in comparison with a fuel injection amount at a time when the result of the determination made by the fuel property determining means indicates standard fuel.

2. A control apparatus for an internal combustion engine according to claim 1, further comprising a first air-fuel ratio difference integrating means for integrating a difference between the air-fuel ratio and a preset reference air-fuel ratio until a predetermined time elapses since start of the control for retarding the ignition timing through the catalyst heat-up control means,
   wherein the fuel property determining means uses an integrated value of a first air-fuel ratio difference, which has been integrated by the first air-fuel ratio difference integrating means, as the parameter value.

3. A control apparatus for an internal combustion engine, comprising:
   intake air amount control means for controlling an intake air amount of the internal combustion engine;
   ignition timing control means for controlling an ignition timing of the internal combustion engine;
   catalyst heat-up control means for increasing the intake air amount after cold start of the internal combustion engine and performing control for retarding the ignition timing;
   air-fuel ratio detecting means for detecting an air-fuel ratio of exhaust gas in the internal combustion engine; and
   fuel property determining means for making a determination on fuel property through a comparison between a parameter value calculated from the air-fuel ratio and a preset reference value when the catalyst heat-up control means performs the control for retarding the ignition timing, further comprising:

average air-fuel ratio calculating means for calculating an average of the air-fuel ratio immediately before start of the control for retarding the ignition timing through the catalyst heat-up control means to output an average air-fuel ratio; and a second air-fuel ratio difference integrating means for integrating a difference between the air-fuel ratio and the average air-fuel ratio until a predetermined time elapses since start of the control for retarding the ignition timing through the catalyst heat-up control means, wherein the fuel property determining means uses an integrated value of a second air-fuel ratio difference, which has been integrated by the second air-fuel ratio difference integrating means, as the parameter value.

4. A control apparatus for an internal combustion engine, comprising:

intake air amount control means for controlling an intake air amount of the internal combustion engine;

ignition timing control means for controlling an ignition timing of the internal combustion engine;

catalyst heat-up control means for increasing the intake air amount after cold start of the internal combustion engine and performing control for retarding the ignition timing;

air-fuel ratio detecting means for detecting an air-fuel ratio of exhaust gas in the internal combustion engine; and fuel property determining means for making a determination on fuel property through a comparison between a parameter value calculated from the air-fuel ratio and a preset reference value when the catalyst heat-up control means performs the control for retarding the ignition timing, further comprising:

air-fuel ratio feedback correction means for outputting an air-fuel ratio feedback correction amount for correcting a fuel injection amount such that the air-fuel ratio coincides with a target air-fuel ratio; and air-fuel ratio feedback correction amount integrating means for integrating the air-fuel ratio feedback correction amount until a predetermined time elapses since start of the control for retarding the ignition timing through the catalyst heat-up control means, wherein the fuel property determining means uses an integrated value of an air-fuel ratio feedback correction amount, which has been integrated by the air-fuel ratio feedback correction amount integrating means, as the parameter value.

5. A control apparatus for an internal combustion engine according to claim 1, further comprising air-fuel ratio lean peak detecting means for detecting a lean peak of the air-fuel ratio until a predetermined time elapses since start of the control for retarding the ignition timing through the catalyst heat-up control means, wherein the fuel property determining means uses a value of the lean peak of the air-fuel ratio, which has been detected by the air-fuel ratio lean peak detecting means, as the parameter value.

6. A control apparatus for an internal combustion engine according to claim 1, further comprising air-fuel ratio lean time detecting means for detecting a time in which the air-fuel ratio is leaner than a preset reference air-fuel ratio until a predetermined time elapses since start of the control for retarding the ignition timing through the catalyst heat-up control means, wherein the fuel property determining means uses a value of an air-fuel ratio lean time, which has been detected by the air-fuel ratio lean time detecting means, as the parameter value.

7. A control apparatus for an internal combustion engine according to claim 1, wherein the reference value is set in accordance with a temperature of a coolant for cooling the internal combustion engine.

* * * * *